US012072084B2

(12) United States Patent
Garrett et al.

(10) Patent No.: US 12,072,084 B2
(45) **Date of Patent: *Aug. 27, 2024**

(54) GEOMETRIC DECORATIVE LIGHT SYSTEM

(71) Applicant: Jem Accessories, Inc., Edison, NJ (US)

(72) Inventors: Jennifer Garrett, Rahway, NJ (US); Elie Chemtob, Eatontown, NJ (US); Charles LaVene, Linden, NJ (US)

(73) Assignee: Jem Accessories, Inc., Edison, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,845

(22) Filed: Jun. 1, 2023

(65) Prior Publication Data

US 2023/0383938 A1 Nov. 30, 2023

Related U.S. Application Data

(63) Continuation of application No. 17/992,448, filed on Nov. 22, 2022, now Pat. No. 11,732,877, which is a continuation of application No. PCT/US2021/035195, filed on Jun. 1, 2021.

(60) Provisional application No. 63/033,115, filed on Jun. 1, 2020.

(51) Int. Cl.

| | |
|---|---|
| ***F21V 23/06*** | (2006.01) |
| ***F21V 23/00*** | (2015.01) |
| *F21Y 115/10* | (2016.01) |

(52) U.S. Cl.

CPC ............ *F21V 23/06* (2013.01); *F21V 23/005* (2013.01); *F21Y 2115/10* (2016.08)

(58) Field of Classification Search

CPC ..... F21V 23/06; F21V 23/005; F21Y 2115/10

See application file for complete search history.

(56) References Cited

U.S. PATENT DOCUMENTS

| | | | | |
|---|---|---|---|---|
| 11,619,374 B1 * | 4/2023 | Lai | F21S 2/005 | 362/249.01 |
| 2001/0024368 A1 * | 9/2001 | Henrici | H01R 13/41 | 362/249.02 |
| 2010/0118532 A1 * | 5/2010 | Liang | F21V 5/04 | 362/249.02 |
| 2012/0243227 A1 * | 9/2012 | Shimizu | F21V 23/06 | 362/249.01 |

(Continued)

*Primary Examiner* — Evan P Dzierzynski

(74) *Attorney, Agent, or Firm* — Goldberg Cohen LLP

(57) ABSTRACT

A geometric light system comprises a plurality of light panel assemblies, each light panel assembly having geometrically shaped base having a plurality of connectors at midpoints of each side. A printed circuit assembly is mounted to the base and has a plurality of light emitting diodes populated thereon with electronic circuitry for selectively illuminating the light emitting diodes, and a prismatically shaped lens affixed to an upper surface of the base. A controller has a printed circuit assembly which includes circuitry and logic for controlling the plurality of light panels. The controller includes an electrical connector at a bottom of one side thereof for connecting with a light panel. A plurality of rigid bridge connectors, each having two opposed ends and two identical electrical connectors, each connector configured to electrically mate with the electrical connectors about the periphery of the light panels for interconnecting the plurality of light panel.

20 Claims, 33 Drawing Sheets

(56) References Cited

U.S. PATENT DOCUMENTS

| | | | | |
|---|---|---|---|---|
| 2014/0268877 | A1* | 9/2014 | Yang | H01L 25/0753 362/613 |
| 2015/0260376 | A1* | 9/2015 | Joo | F21V 5/007 362/322 |
| 2018/0156435 | A1* | 6/2018 | Kwon | F21V 17/02 |
| 2019/0132928 | A1* | 5/2019 | Rodinger | H05B 45/20 |

* cited by examiner

GEOMETRIC DECORATIVE LIGHT SYSTEM

CROSS-REFERENCE TO RELATED APPLICATION

This application is a continuation of U.S. Nonprovisional application Ser. No. 17/992,448 filed on Nov. 22, 2022, which is a continuation of Nonprovisional Application PCT/US21/35195 filed on Jun. 1, 2021 which claims the benefit of U.S. Provisional Patent Application Ser. No. 63/033,115 filed on Jun. 1, 2020, which are incorporated herein in their entirety.

FIELD OF THE INVENTION

A series of electro illuminating components designed to be electrically interconnected one with another and placed upon a surface in any of a variety of desired patterns and arrangements.

BACKGROUND OF THE INVENTION

Lighting has always been a necessity of everyday life. Throughout history, mankind has desired to illuminate the dark. Wood fires built on the ground, candles, oil lamps, gas lamps and others have been an evolutionary process through the ages. With the advent of electricity and the invention of the incandescent light bulb in the late 19$^{th}$ century our quest for perpetual light was solved. Mankind no longer needed to stumble in the dark with the introduction of a variety of incandescent lighting devices.

Other than the introduction of neon and fluorescent lighting, innovation in the lighting world revolved around various applications of the incandescent light. Colored lights were the result of using colored glass for the bulb or of a colored coating to the lightbulb. However, the use of the incandescent lightbulbs was limited by their relatively inefficient use of electricity resulting in relatively high power consumption and a significantly high thermal signature. Incandescent lights were thus typically relegated to provide white light for general illumination usage. For the most part, decorative lighting was limited to strings of incandescent lights, either white or colored, placed where its heat signature was of minimal consequence and usually only utilized for special occasions to minimize power usage.

The latter part of the 20$^{th}$ century and early 21$^{st}$ century saw the development and introduction the light-emitting diode (LED). An LED is much more efficient in its usage of electricity thus reducing its size and thermal signature relative to an incandescent light and is thus more adaptable to a variety of applications. We have now seen the incandescent light bulb being replaced by the LED light bulb and with multi-colored LEDs now able to emit a variety of colors their use has penetrated almost every aspect of everyday life. The efficiency and low cost of LEDs now make possible lighting devices which are affordable to both purchase and operate and readily adaptable for decorative purposes.

SUMMARY OF THE INVENTION

In accordance with the invention, a geometric light system comprises a plurality of light panel assemblies, each light panel assembly further comprising a base having a regular geometric shaped outer periphery, the base defining a connector aperture in a bottom of the base at a midpoint of each side of the geometric shape, a printed circuit assembly mounted to the base and having a plurality of light emitting diodes populated thereon and electronic circuitry for selectively illuminating the light emitting diodes. A plurality of electrical connectors are positioned about a periphery of the printed circuit assembly, each electrical connector in registration with one of the connector apertures defined in the base. A prismatically shaped lens is affixed to an upper surface of the base. A controller has a base receiving an electrical power cord, the power cord electrically connected to a printed circuit assembly mounted on the base wherein the printed circuit assembly includes the circuitry and logic for controlling the plurality of light panel assemblies. The controller further includes an electrical connector at a bottom of one side thereof, the controller electrical connector being identical to the electrical connectors of the light panel assembly. A plurality of rigid bridge connectors, each having two opposed ends and two identical electrical connectors. A first of the connectors is positioned at a first end and a second of the connectors positioned at a second end. The first connector is configured to electrically mate with one of the electrical connectors about the periphery of a first light panel assembly and the second electrical connector configured to electrically mate with one of the electrical connectors about the periphery of a second light panel assembly.

In another aspect, the regular geometric shape is an equilateral triangle.

In a further aspect, the base includes a visible orientation arrow corresponding to the arrangement orientation of the light emitting diodes on the printed circuit assembly.

In yet another aspect the prismatically shaped lens is translucent.

In another aspect the lens has a raised center and faceted sides, each facet corresponding to a side of the geometric shape of the base.

In a further aspect the controller further includes a plurality of microswitches electrically interconnected with the controller printed circuit assembly.

In an additional aspect the controller further includes circuitry and logic to be remotely responsive to wireless electronic inputs from a remote electronic device for controlling the plurality of light panels.

In another aspect each of the rigid bridge connectors is directionally biased to permit flow of electrical signals in one direction only, each connector bearing a visible legend identifying the directional bias of the connector.

In a further aspect the printed circuit assembly of the light panel assembly further includes circuitry and logic to illuminate the light emitting diodes thereon in a plurality of predetermined patterns and light motions.

In yet an additional aspect, the light panel assemblies of the system are identically responsive to electrical signals from the controller to display identical light patterns and motions concurrently.

In a further aspect, the light panel assemblies of the system are responsive to electrical signals from the controller to display a progressive light pattern and motion across the plurality of the light panel assemblies.

In another aspect the system further includes a hexagonal mounting bracket wherein the mounting bracket has a magnet housed therein.

In a further aspect, the light panel assembly base defines a hexagonal aperture in a bottom surface thereof for receiving the hexagonal mounting bracket.

In an additional aspect, the light assembly base further includes a magnetically sensitive plate mounted over the hexagonal aperture in a manner that the magnetic force of the mounting bracket magnet retains the light panel assembly in a desired location and position, the light panel assembly being readily detachable and repositionable from the hexagonal mounting bracket by overcoming the magnetic force.

In another aspect the rigid bridge connectors are electrically bidirectional.

In a further aspect the printed circuit assembly of the light panel assembly further includes circuitry and logic to determine which of the connectors at its various sides is functioning as an electrical input and automatically electrically configures the remaining connectors at its remaining sides as an electrical output.

Further embodiments and features of the invention will become apparent in conjunction with the detailed description of the inventions and their preferred embodiments provided hereafter.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
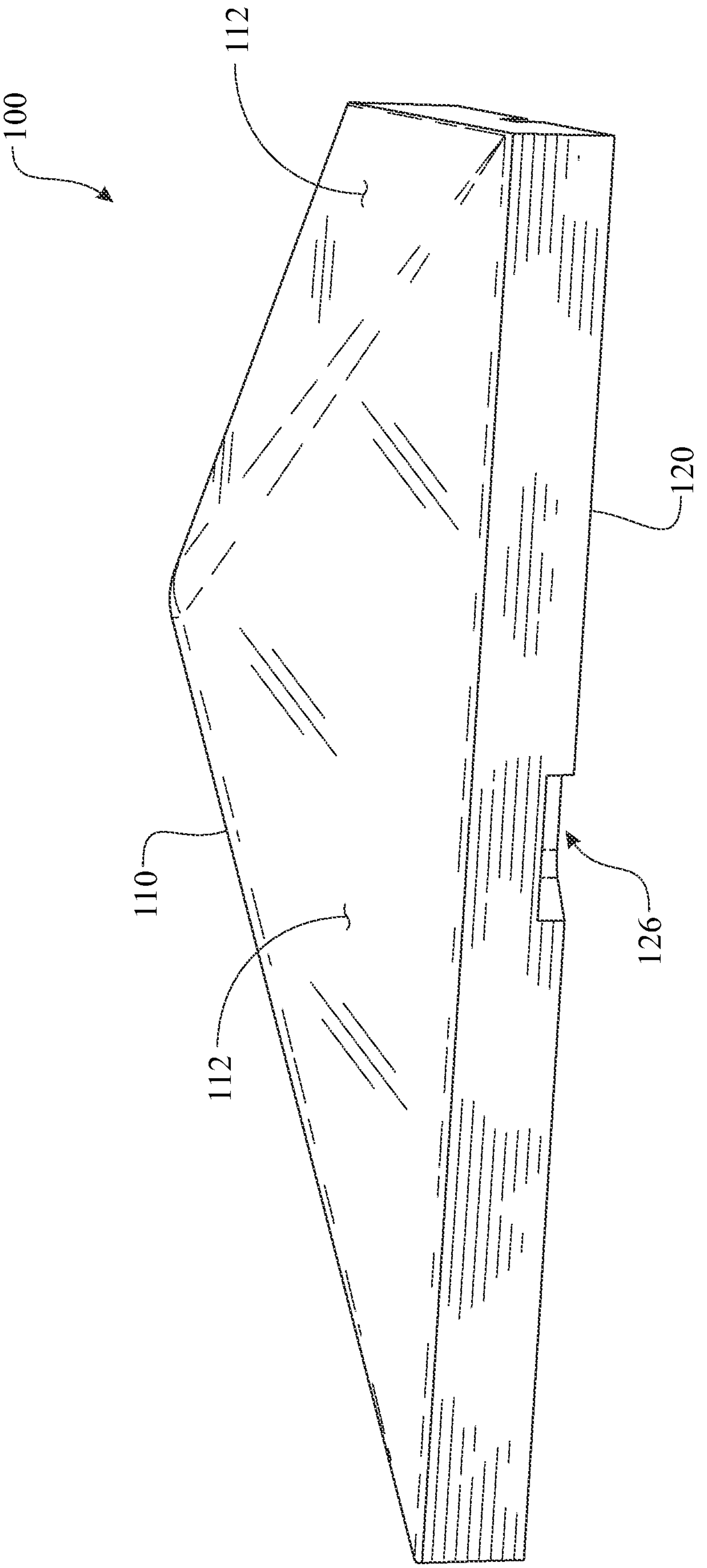
FIG. 1 presents an isometric top, right front view of a geometric light panel assembly according to the present invention.
Figure 2:
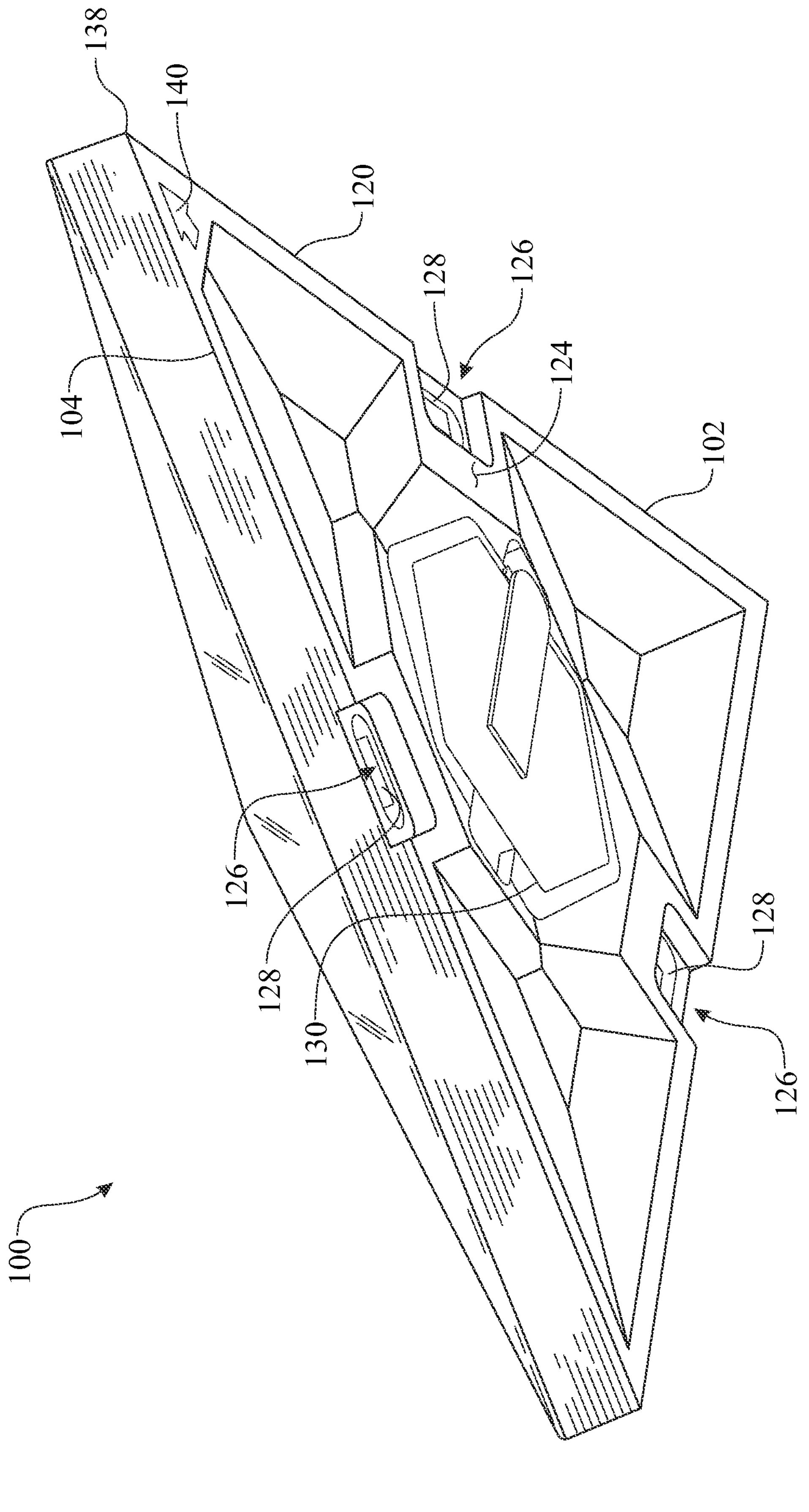
FIG. 2 presents an isometric bottom, right rear view of the geometric light panel.
Figure 3:
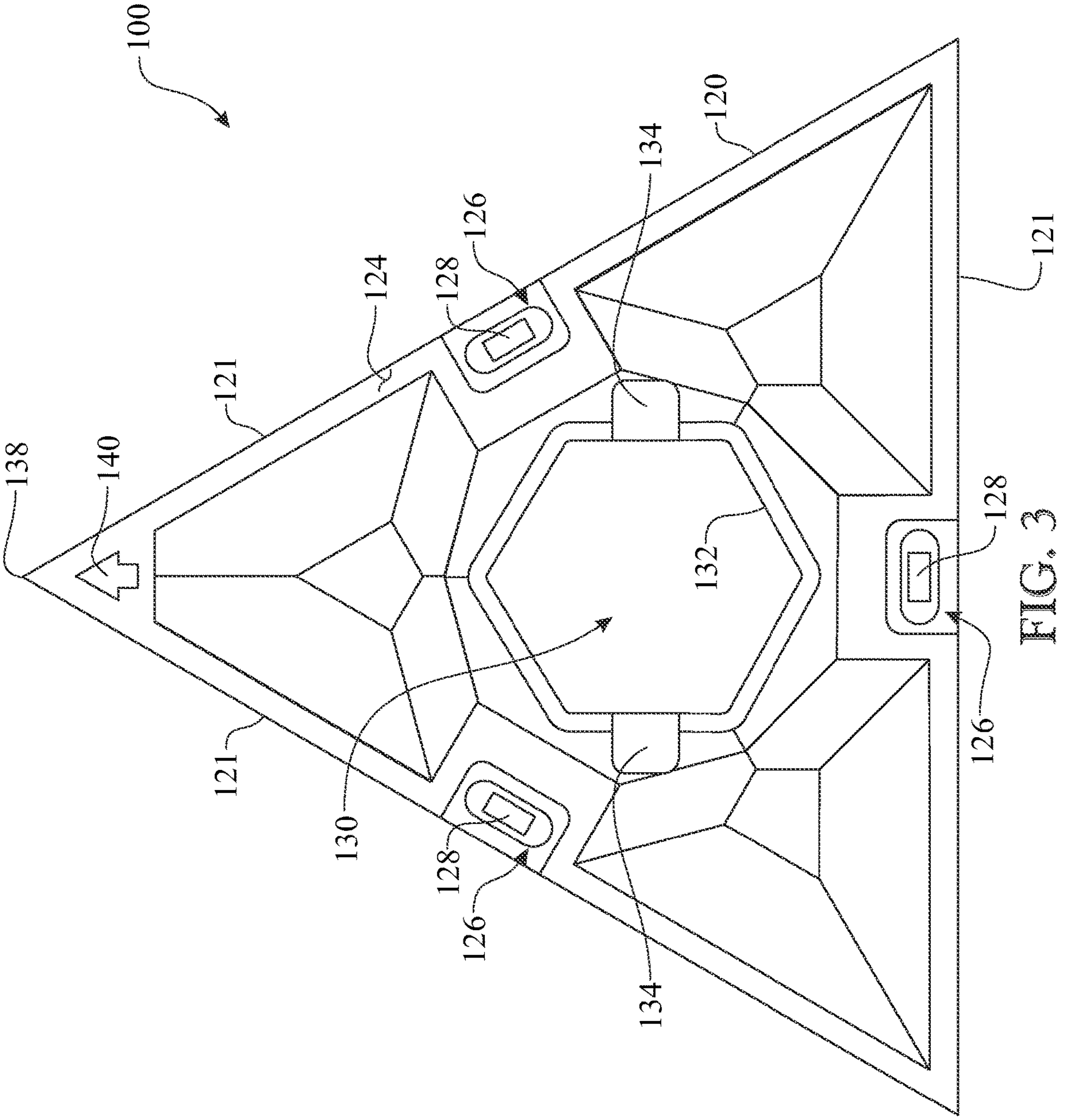
FIG. 3 presents bottom view of the geometric shaped light panel.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims Hence, specific dimensions and other physical characteristics relating to the embodiments disclosed herein are not to be considered as limiting, unless the claims expressly state otherwise.

Turning now to the drawings, and in particular, FIGS. 1-5, an exemplary geometric light panel assembly 100 is illustrated. The geometric light panel 100 shown and discussed herein is depicted as a triangular shaped panel having three sides 121, but those practiced in the art will recognize that the designs and concepts disclosed herein can readily be adapted for other substantially regular geometric shapes. Consequently, although adaptable to other shapes the discussion herein will be directed to a substantially equilateral triangle. The triangular light panel assembly 100 includes a base 120 molded of a resin having an external periphery 102 and an upper edge 104 in the shape of a triangle and forming an internal cavity 122. A top lens 110 formed of a translucent resin is affixed to the upper peripheral edge 104 of the base 120 utilizing ultrasonic welding, thermal welding, chemical adhesive, or other such method known in the art. The top lens is prismatically formed to create a raised faceted lens having a raised center and further including a facet 112 corresponding to each side of the light panel assembly 100 for enhanced visibility.

The bottom surface 124 of the base 120 is formed such that the structure of the base 120 forms one connector recess 126 at a midpoint of each side 121 of the triangular shape. Each connector recess 126 further defines a connector port 128 extending through the structure. Additionally, a hexagonal aperture 130 is formed in the center of the base 120 and is defined by a hexagonally shaped internal wall 132 for receiving a hexagonal mounting bracket 190. The base 120 further forms oppositely positioned finger recesses 134 at opposite sides of the hexagonal aperture 130. An orientation arrow 140 is integrally formed in the bottom surface 122 of the base 120 and at one apex 138 of the triangle. The orientation arrow 140 is utilized for reference purposes when integrally interconnecting multiple ones of the triangular light panels 100.

Figure 4:
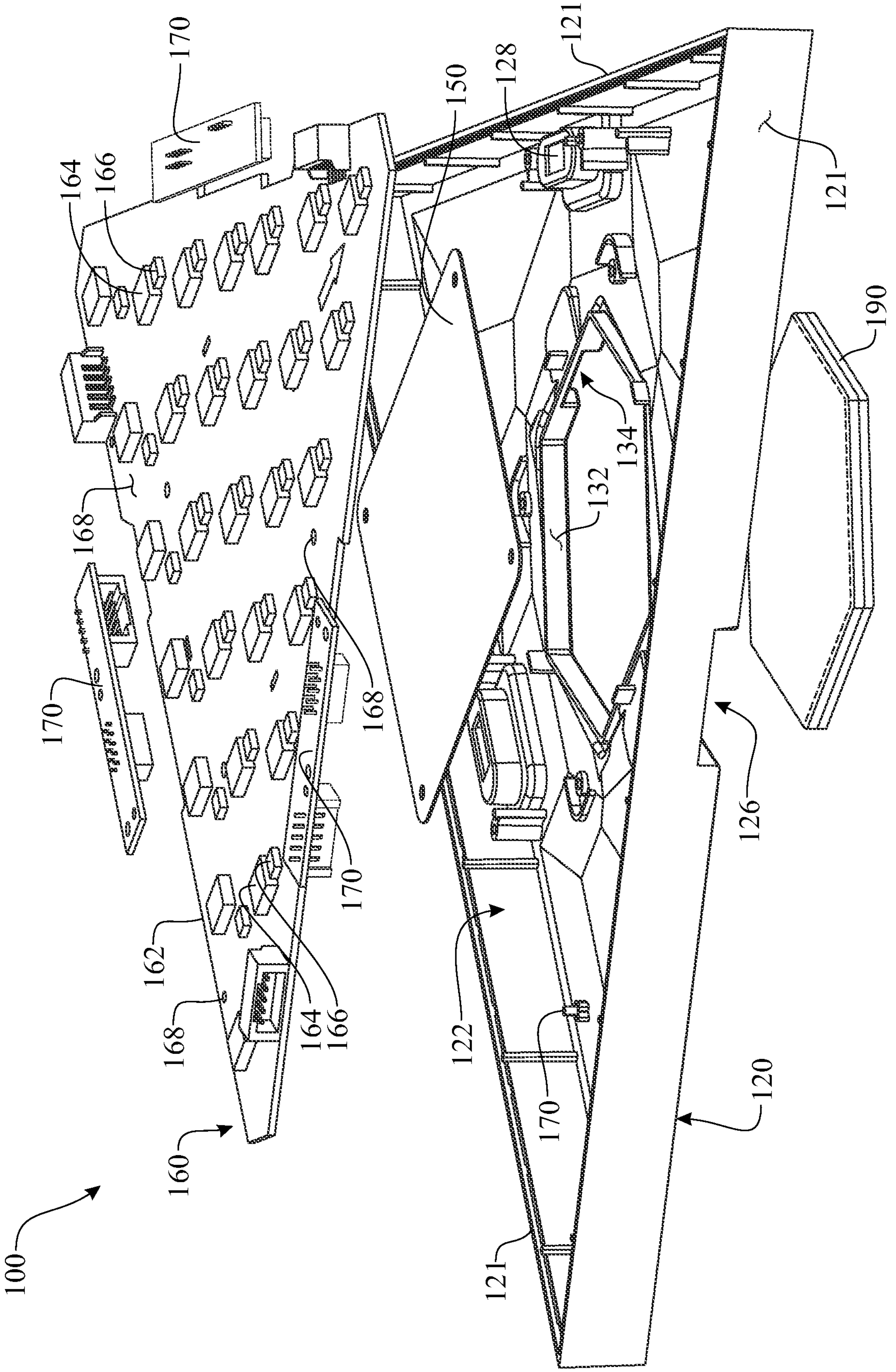
FIG. 4 presents an exploded isometric top, right front view of the geometric light panel with the top lens cover removed.
Figure 5:
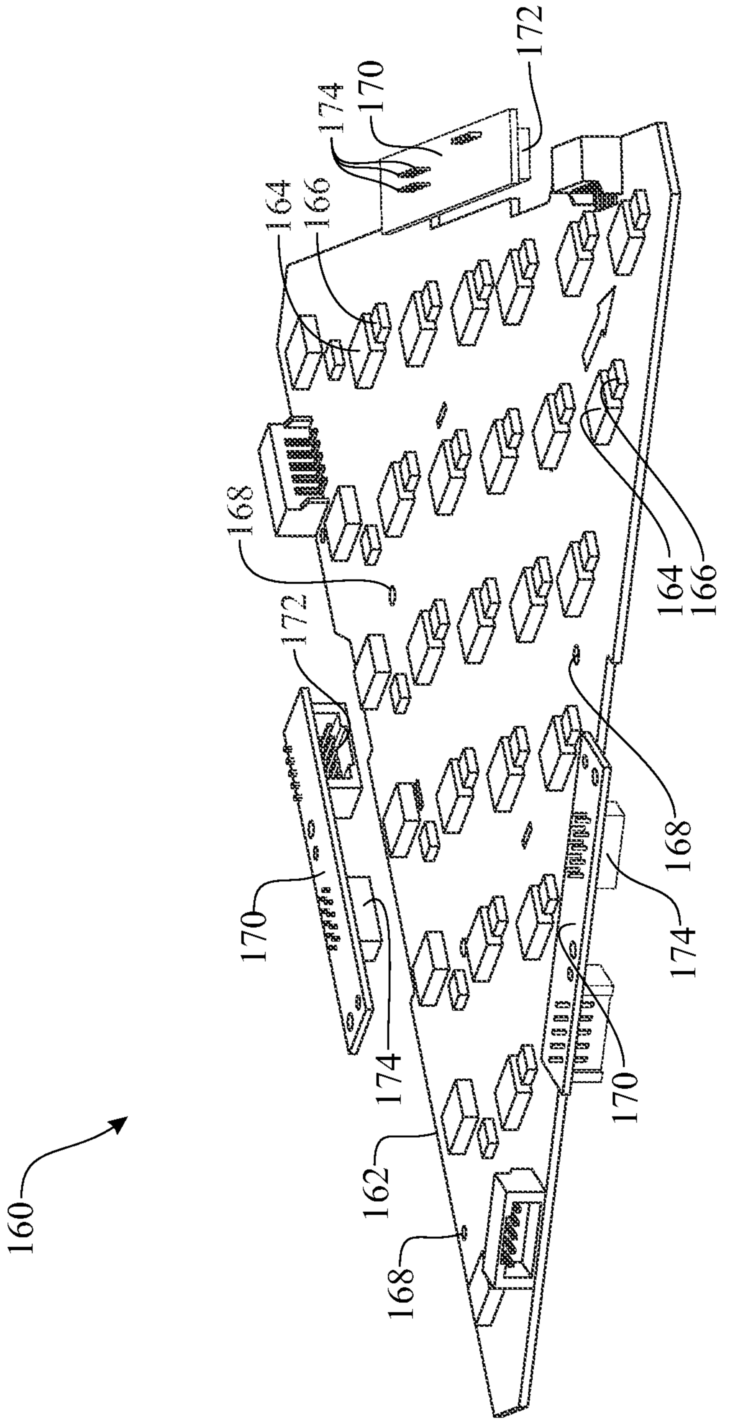
FIG. 5 presents an isometric view of the printed circuit assembly populated with a plurality of multi-colored LEDs.

Internally, and as shown in FIGS. 4-5, a plate 150 formed from steel or other rigid ferrous material sensitive to magnetic force covers the hexagonal aperture 130 through the central portion of the base 120. A printed circuit board 162 is populated with a plurality of light emitting diodes (LEDs) 164, 166 on an upper surface 168 to form a printed circuit assembly (PCA) 160 which substantially extends to the three sides 121 of the triangular light panel assembly 100. The LEDs 164, 166 are substantially uniformly distributed on the PCA 160 to provide a uniform intensity of light emitting therefrom when all the LEDs 164, 166 are lit with the same light intensity. There are two types of LEDs populated thereon. A first type of LED 166 illuminates with a white light and a second type of LED 164 illuminates with colored light wherein the particular color illuminated thereby is a function of the voltage supplied to the second LEDs 164 as known in the industry. The PCA 160 includes registration holes 168 therethrough which, in turn, receive registration pins 170 integrally formed within the interior portion 122 of the base 120 for the proper registration of the PCA 160 within the light panel assembly 100. The PCA 160 and the steel plate 150 are affixed within the base with mounting screws (not shown) which are received in mounting screw receptacles also formed in the interior of the base in a manner known in the art. The mounting screws can further be magnetic to temporarily attach to a screwdriver to aid in the installation of the PCA 160 and the steel plate 150 thereof.

The PCA 160 further can have integrated thereon circuitry (not shown) to illuminate the LEDs 164, 166 in predefined patterns and light motions such as blinking, fading, fading colors, light motions across the PCA, etc. The patterns can be triggered by an external source such as a controller 200 (discussed below). The predefined patterns are oriented with respect to the orientation arrow 140. In this manner, all light panel assemblies 100 can display identical patterns and motions with respect to the respective orientation arrows 140 of each light panel assembly 140.

Connector adapters 170 are mounted to each side of the PCA 160 wherein each adapter 170 includes at one end thereof a connector 172 for engaging the conductive elements in the PCA 160 for operational control and powering of the LEDs 164, 166. At an opposite end of the connector adapter 170 a connector receptacle 174 is positioned substantially at a midpoint of each of the triangle's sides 121 and in registration with one of the connector ports 128 defined by the base 120. The bottom surface 124 of the base 120 may further define a recess 126 at the connector to receive a bridge connector 180 that interconnects one triangular light panel 100 with another.

Figure 7:
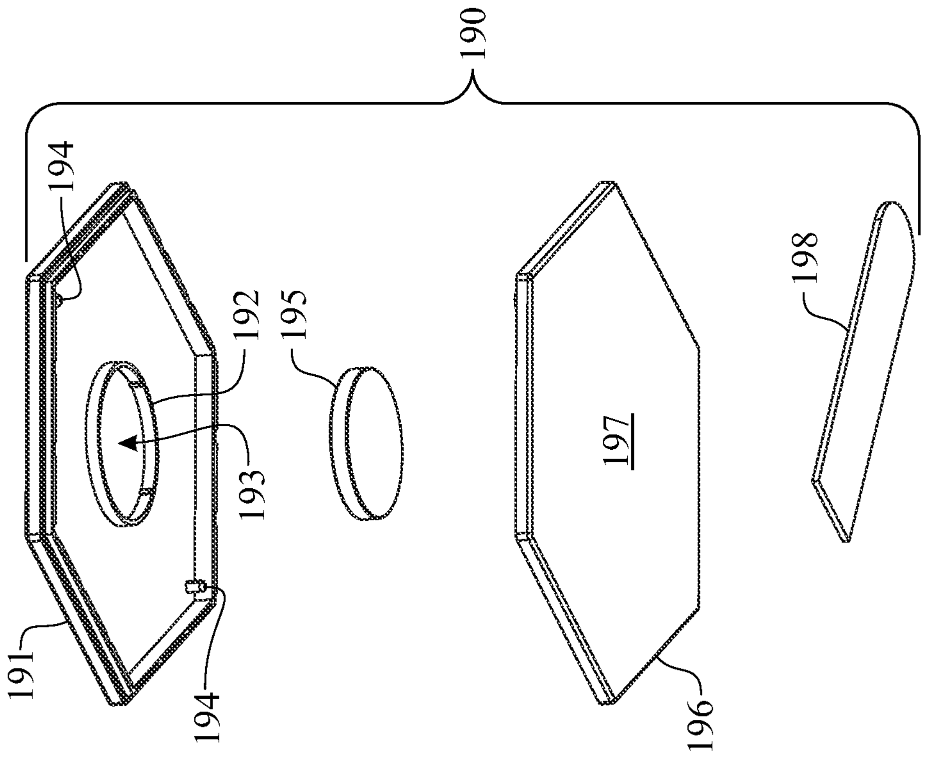
FIG. 7 presents an exploded bottom isometric view of the hexagonal mounting bracket.
Figure 6:
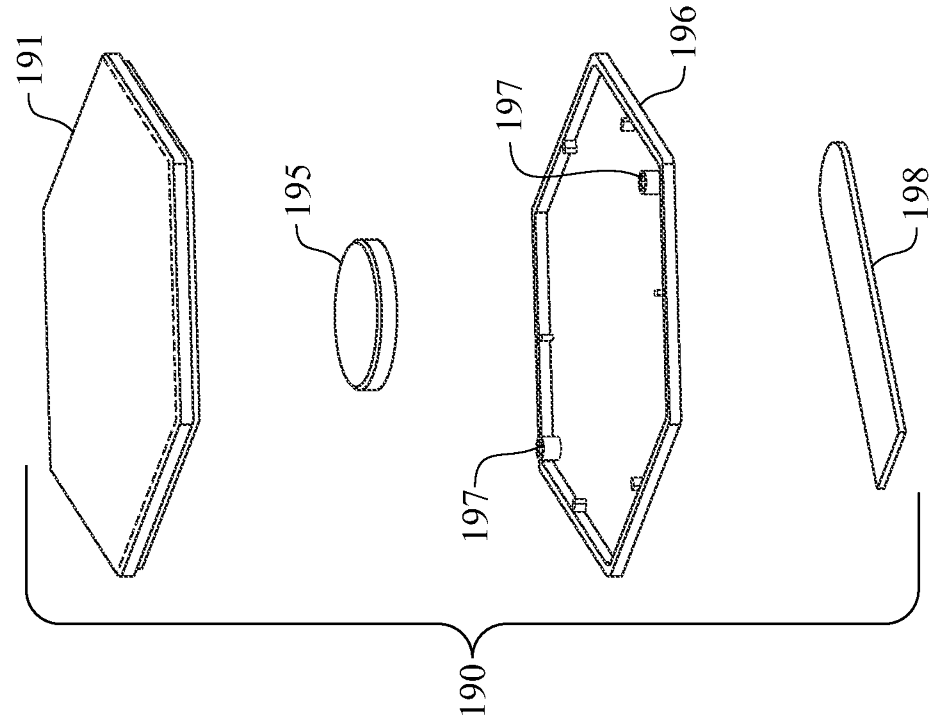
FIG. 6 presents an exploded top isometric view of a hexagonal mounting bracket.

Referring now to FIGS. 6-7, the hexagonal mounting bracket 190 is illustrated in an exploded form wherein a hexagonally shaped base 191 has formed therein a circular rib 192 defining a circular recess 193, and registration pins 194 are integrally formed within the base 191. A disk-shaped magnet 195 is received in the circular recess 192 and a hexagonally shaped top 196, which includes pin receptacles 197, is mated to the base 191 such that the registration pins are received in the pin receptacles for proper alignment of the top 169 to the base 191. The top 196 can be bonded to the base 191 using ultrasonic welding, chemical adhesives, or other such bonding methods known in the art. A double-sided adhesive strip 198 has one side 199 adhesively affixed to the outer surface 197 of the mounting bracket 190, the other side of the adhesive strip to be utilized for affixing the mounting bracket 190 to a wall or other such surface where the triangular light panel assembly 100 is desired to be displayed. The hexagonally shaped mounting bracket 190 is received in the hexagonal aperture 130 of the triangular light panel assembly base 120 and is removably retained therein by the magnetic attraction of the mounting bracket magnet 195 to the steel plate 150 mounted at the hexagonal aperture 130 of the base 120. Those practiced in the art will recognize that the mounting bracket 190 can be of any desired regularly shaped polygon and a correspondingly shaped aperture in the base. The number of sides for the regular polygon is dependent upon the number of different rotational positions desired for the geometric light panel 100. The mounting bracket 190 permits the use of a damage-free removable adhesive strip that can be completely hidden when the system is mounted and fully assembled. The use of the removable adhesive strip creates a clean final appearance and allows the user to easily remove panels and break the adhesive bond between the mounting bracket 190 and the surface to which the mounting bracket 190 is attached.

While the hexagonal mounting bracket 190 and corresponding hexagonal aperture 130 and ferrous plate 150 have been described herein, other mounting configurations are also contemplated. Although not illustrated herein such mounting configurations as a hook and eye, hook and loop, reusable gel-based micro-suction and other similar methodologies are also possible.

Figure 8:
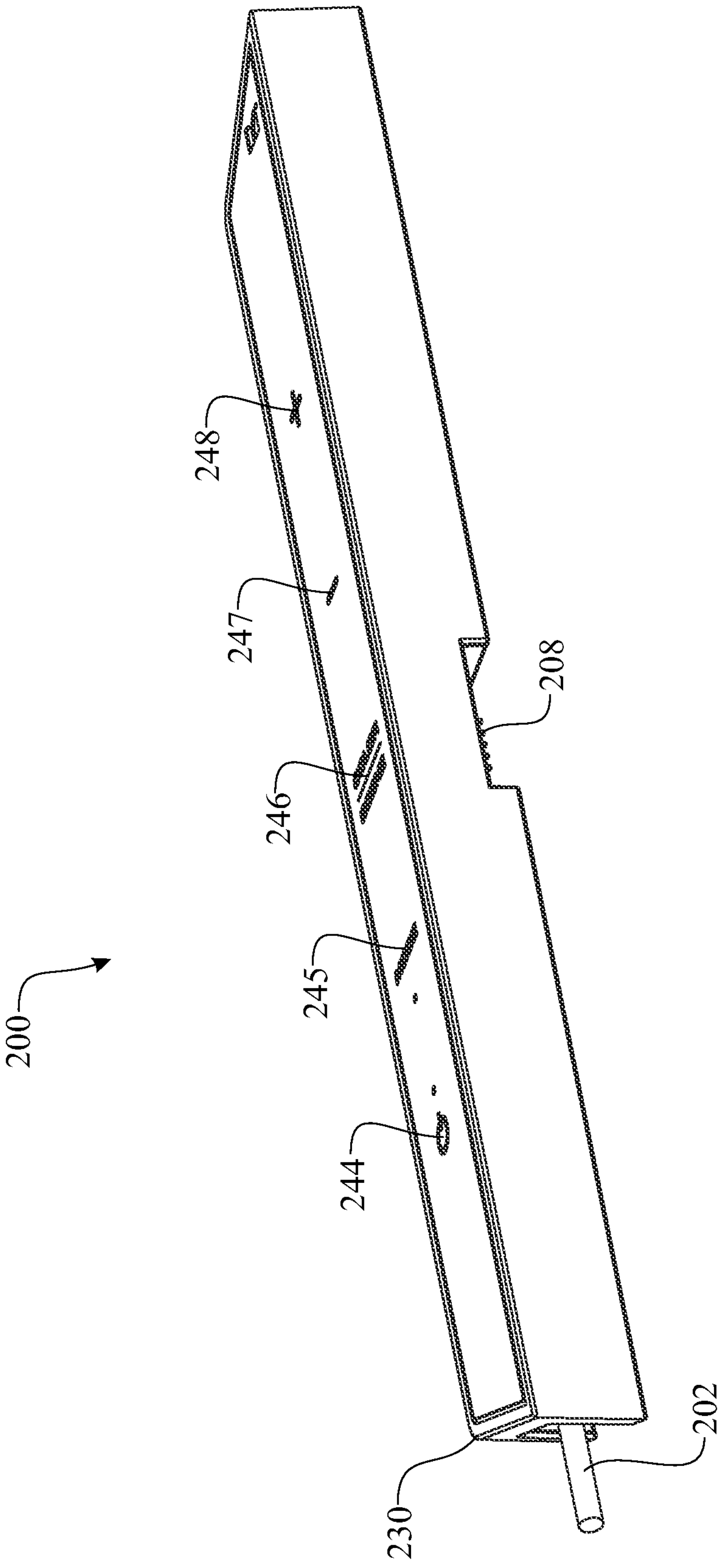
FIG. 8 presents an isometric top view of the controller.
Figure 9:
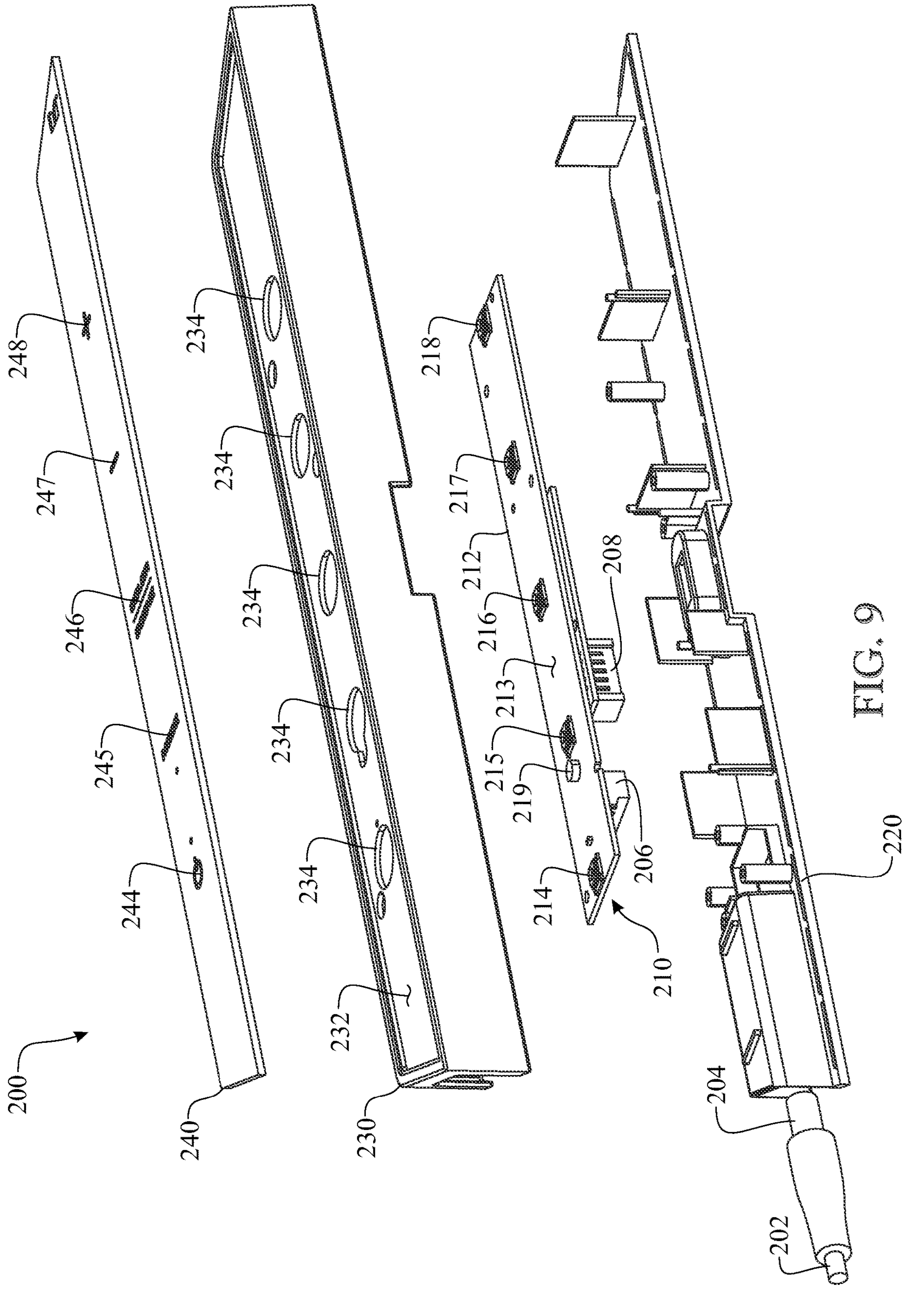
FIG. 9 presents an exploded isometric top, left front view of the geometric light panel.

A controller 200 external to the light panel assembly 100 is part of the lighting system and is illustrated in FIGS. 8-9. The controller 200 includes a base 220 onto which is received one end 204 of a power cord 202 of a known configuration. The base 210 further includes an integral signal and power connector 208 of an identical configuration as the connector receptacles 174 for mating therewith at the midpoint of each side 121 of the triangular light panel 100. A printed circuit assembly (PCA) 210 comprises a printed circuit board 212 and on an upper surface 213 thereof is mounted a plurality of microswitches 214-218. A lower surface of the PCA 210 includes a power receptacle 206 for interfacing with the power cord 202. Micro circuitry (not shown) for generating control signals to the light panel assemblies 100 is also mounted on the lower surface of the PCA 210. A body 230 is mated to the base 220 and has a recessed face 232 which defines a plurality of apertures 234 therethrough, each aperture 234 is positioned to be in registration with one of the microswitches 214-218. A flexible membrane 240 is affixed to the recessed face 232 and includes a plurality of legends 244-248 printed thereon. Each legend 244-248 is positioned over a respective microswitch 214-218 to indicate the function of that microswitch. These functions include "on/off" 244, "mode select" 245, "color/scene select" 246, "intensity decrease" 247, and "intensity increase" 248 designators. The PCA 210 can also include on the upper surface 213 thereof an LED 219 which can be illuminated in either a steady fashion or a blinking fashion to designate different phases of the controller status.

Further, the PCA 210 can include electronic circuitry (not shown) for the processing capability and resident instruction sets to be paired with a Wi-Fi system in a manner known in the art. Remote control of the controller functions for the geometric decorative light system can be facilitated by the inclusion of an application on a smart phone also paired with the Wi-Fi system or other pairings of a known type to facilitate remote wireless control.

Figure 11:
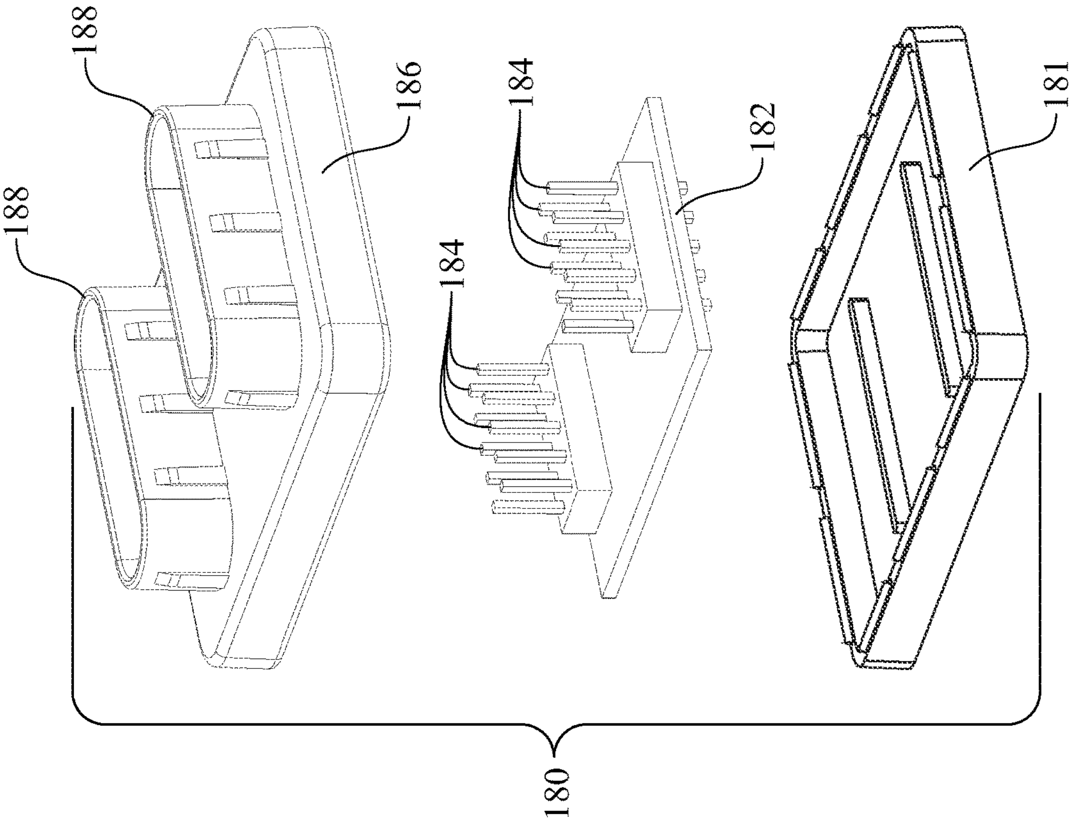
FIG. 11 presents an exploded isometric top view of the rigid panel connector.
Figure 10:
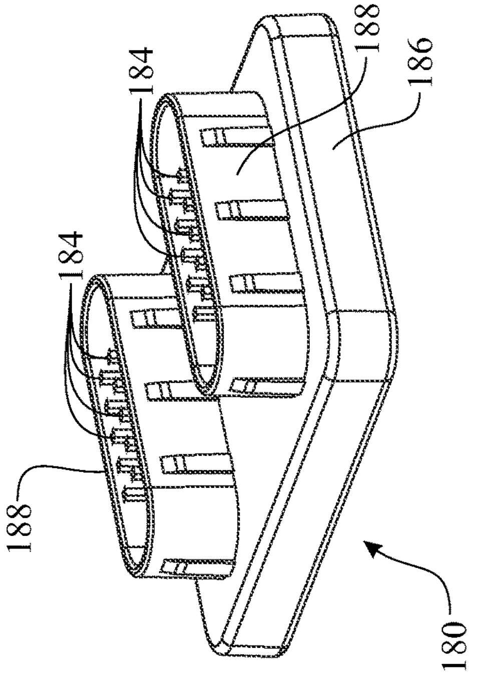
FIG. 10 presents an isometric top view of the rigid panel connector.
Figure 12:
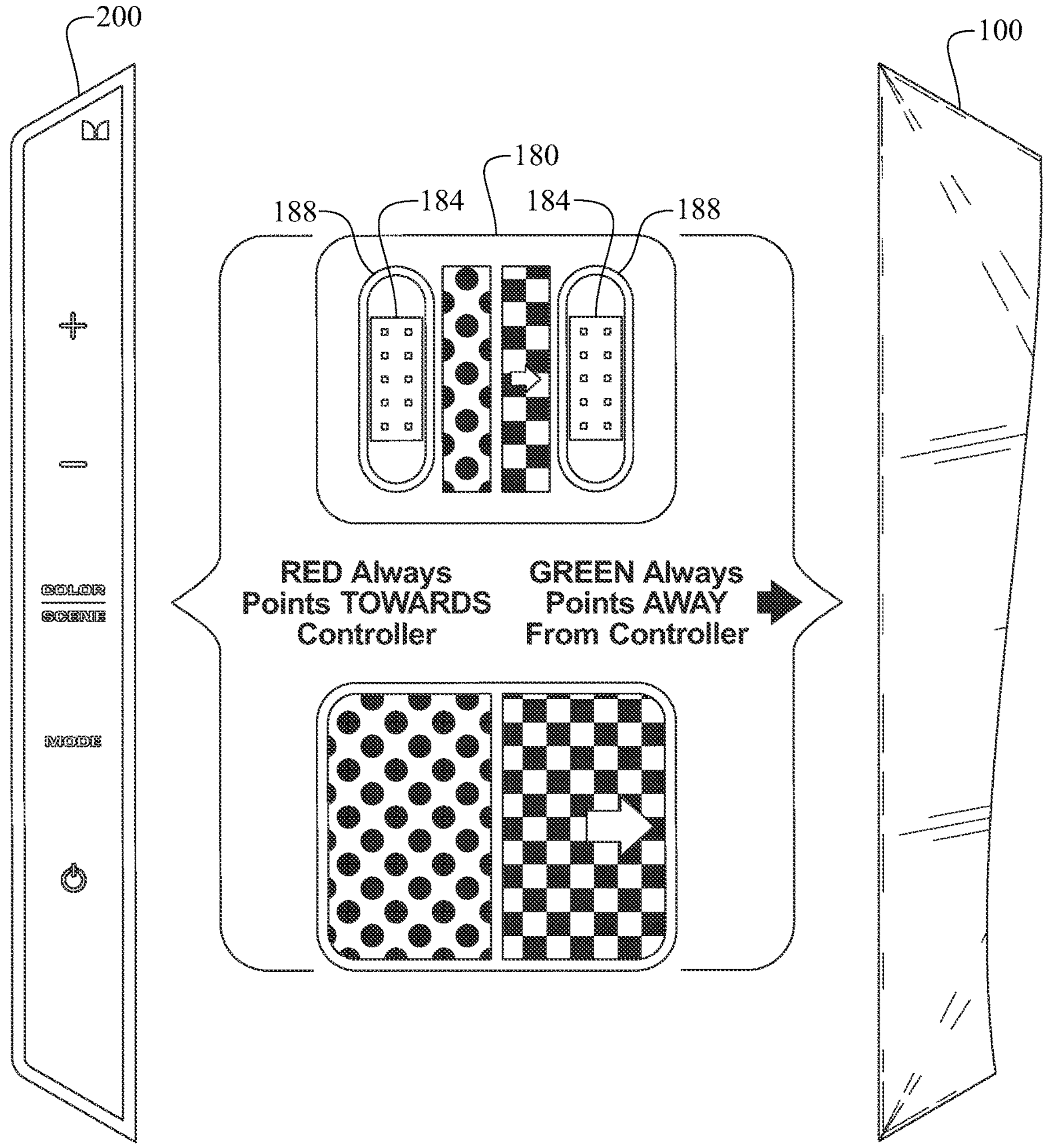
FIG. 12 presents to view of an optionally coded rigid panel connector.

Referring to FIGS. 10-11, a rigid bridge connector 180 is provided to interconnect a first light panel assembly 100 with an adjacent second light panel assembly 100. The bridge connector 180 comprises a rigid base 181 supporting a small printed circuit board 182 that is populated with two identical multipin plugs 184. The multipin plugs 184 are pin-for-pin interconnected and matingly compatible with the receptacles 174 at the sides 121 of the triangular light panels 100. A top cover 186 is affixed to the base 181 and retains the printed circuit board 182 and plugs 184 in place and further provides a protective shell 188 around each pin set of the plugs 184. The plugs 184 are spaced one from the other such that when each is engaged in adjacent triangular light panel receptacles 174, the respective sides 121 of the adjacent light panels are closely retained one to the other. While each of the plugs 184 are identical in function and configuration, one or both, as illustrated in FIG. 12, may be color-coded or marked for reference purposes as described further below.

The rigid bridge connector 180 further includes circuitry including a plurality of diodes (not shown) for directionally biasing the flow of electrical power and electronic signals between respective plugs 184. In this manner, one bridge connector 180 can function as an input to a light panel assembly 100. One or more identical bridge connectors 180 can then be utilized in a reversed orientation at the other sides 121 and mated with the respective connectors 174 at the remaining sides 121 of the light panel assembly 100 to function as an output therefrom for electrical power and electronic signals to adjacent ones of the light panel assemblies 100 of a system of interconnected light panel assemblies 100.

In an alternate configuration, the bridge connector 180 does not include the biasing diodes and circuitry and performs its interconnectivity function in any orientation. While the necessity for limiting the connectivity between adjacent light panel assemblies 100 to only one electrical input is still a requirement, this function is relocated to the PCA 160 in each light panel assembly 100. This circuitry detects which of the receptacles 174 is functioning as an input and automatically configures the remaining receptacles 174 as outputs. In this manner, the user need only arrange the light panel assemblies according to a desired visual light pattern without the concurrent necessity of reconfiguring the bridge connectors 180 to accomplish the required electrical flow pattern.

In use, one or more of the triangular light panels 100 can be mounted to a wall or other surface by removing the protective layer of the double-sided adhesive element 198 on the mounting bracket 190 and then firmly pressing the unit against the surface to which it is to be mounted. Once the adhesive bonds to the surface, the individual light panel 100 can be reoriented by disengaging the light panel 100 from the mounting bracket 190 by overcoming the magnetic force between the magnet 195 and the steel plate 150 and rotating the light panel assembly 100 in any one of six different orientations. The number of orientations is a function of the geometric shape of the mounting bracket 190 and the corresponding aperture 130. The light panel 100 can then be engaged again with the mounting bracket 190 by receiving the mounting bracket 190 within the hexagonal aperture 130. Each light panel assembly 100 of a desired system of light panels is mounted in a like manner.

Figure 13:
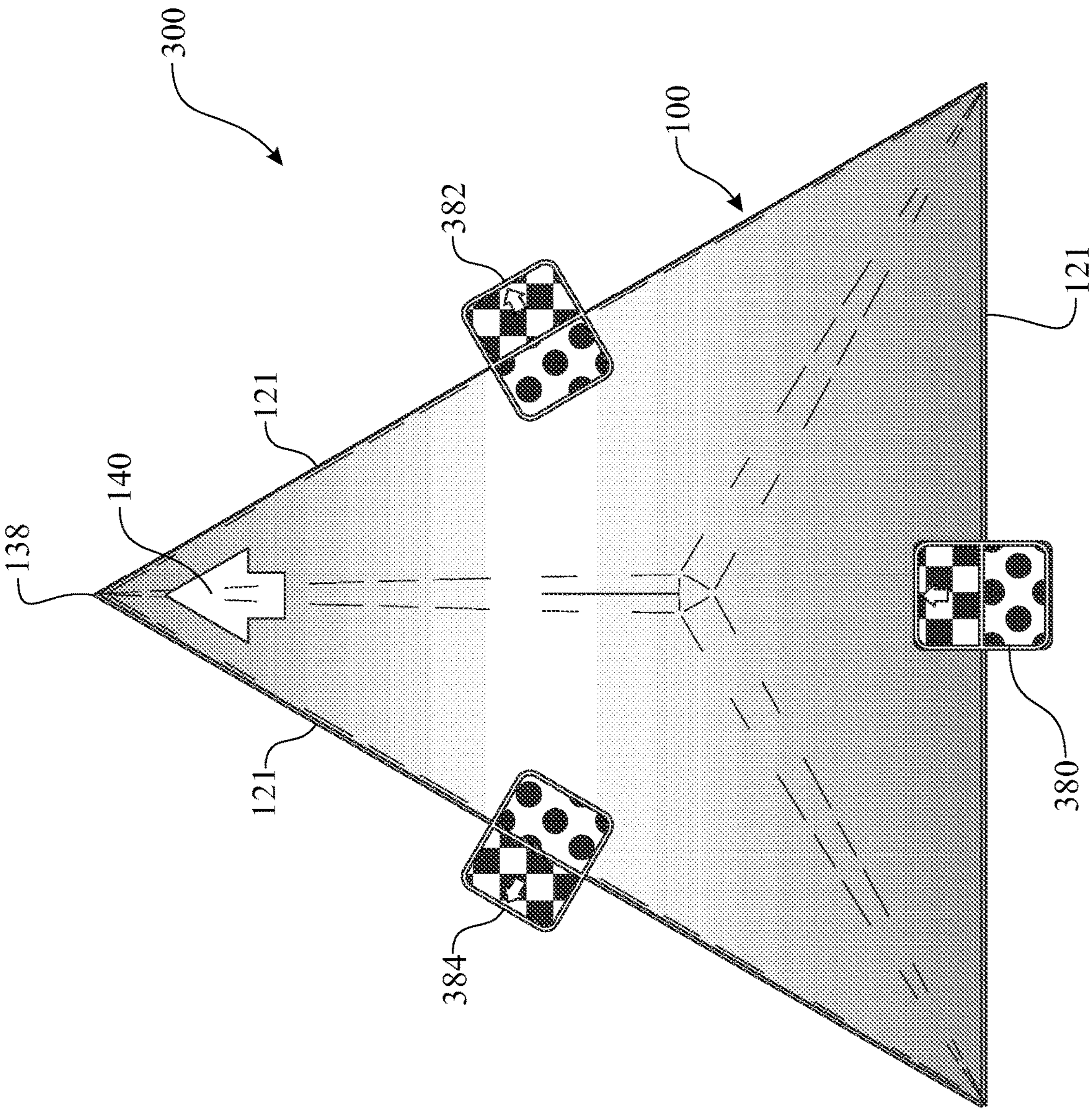
FIG. 13 presents a top view of a geometric light panel illustrating a first connector configuration with respect to the panel light shading orientation.
Figure 14:
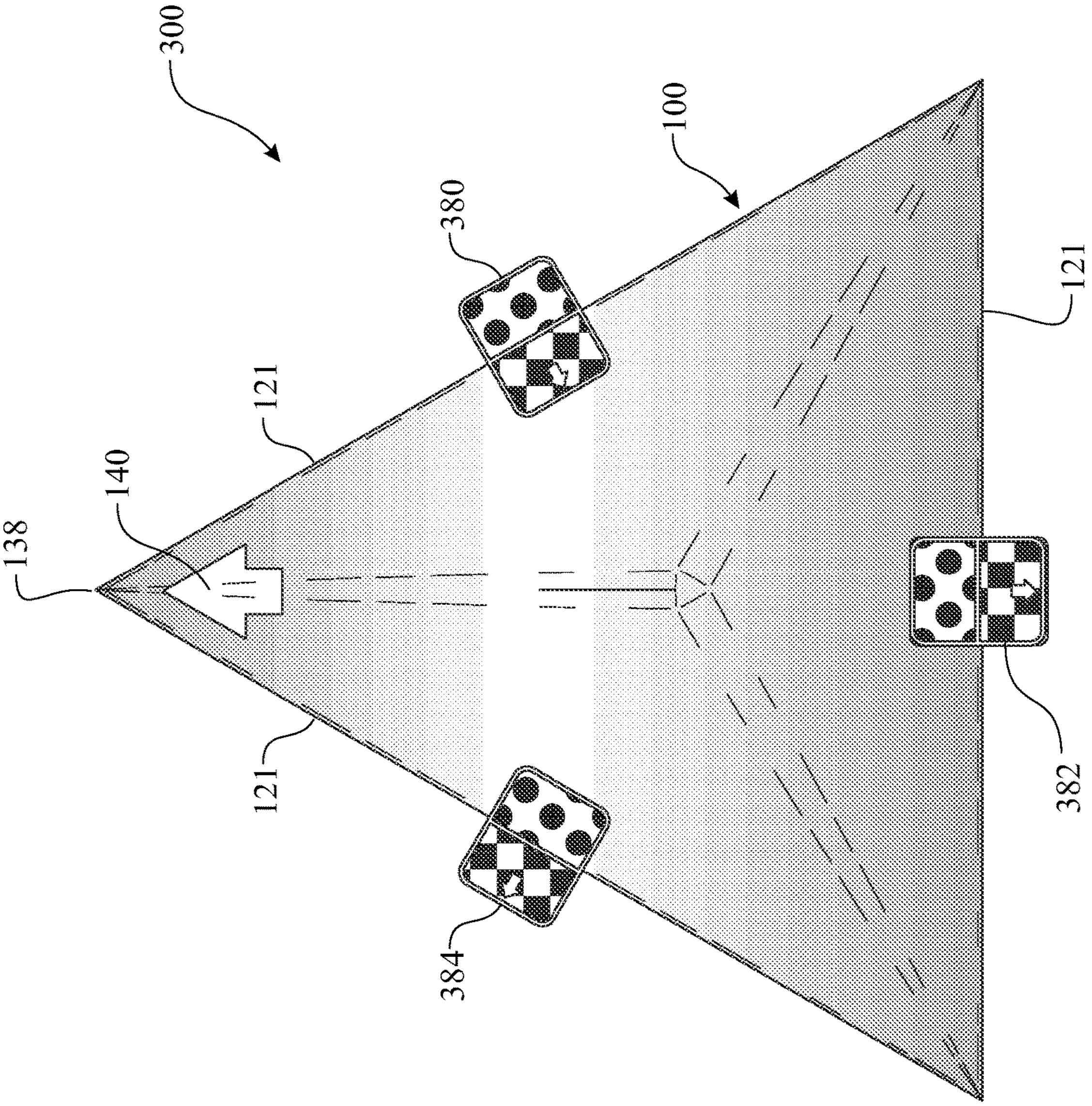
FIG. 14 presents a top view of a geometric light panel illustrating a second connector configuration with respect to the panel light shading orientation.

Referring now to FIGS. 13-14, connector configurations 300 are illustrated with respect to the sides of a triangular light panel 100. FIG. 13 illustrates that an input connector 380 is engaged at a base of the triangular light panel 100 (the orientation arrow 140 defining an apex corner 138 of the triangle). Each of the remaining sides 121 have a rigid bridge connector 382, 384 engaged thereto respectively wherein these connectors 382, 384 then function as input connectors to an adjacent triangular light panel 100. Alternatively, as shown in FIG. 14, the input connector 380 is engaged at one side of the triangular light assembly 100 and the output connectors 382, 384 are engaged at the base of the triangle and the remaining side.

Figure 15:
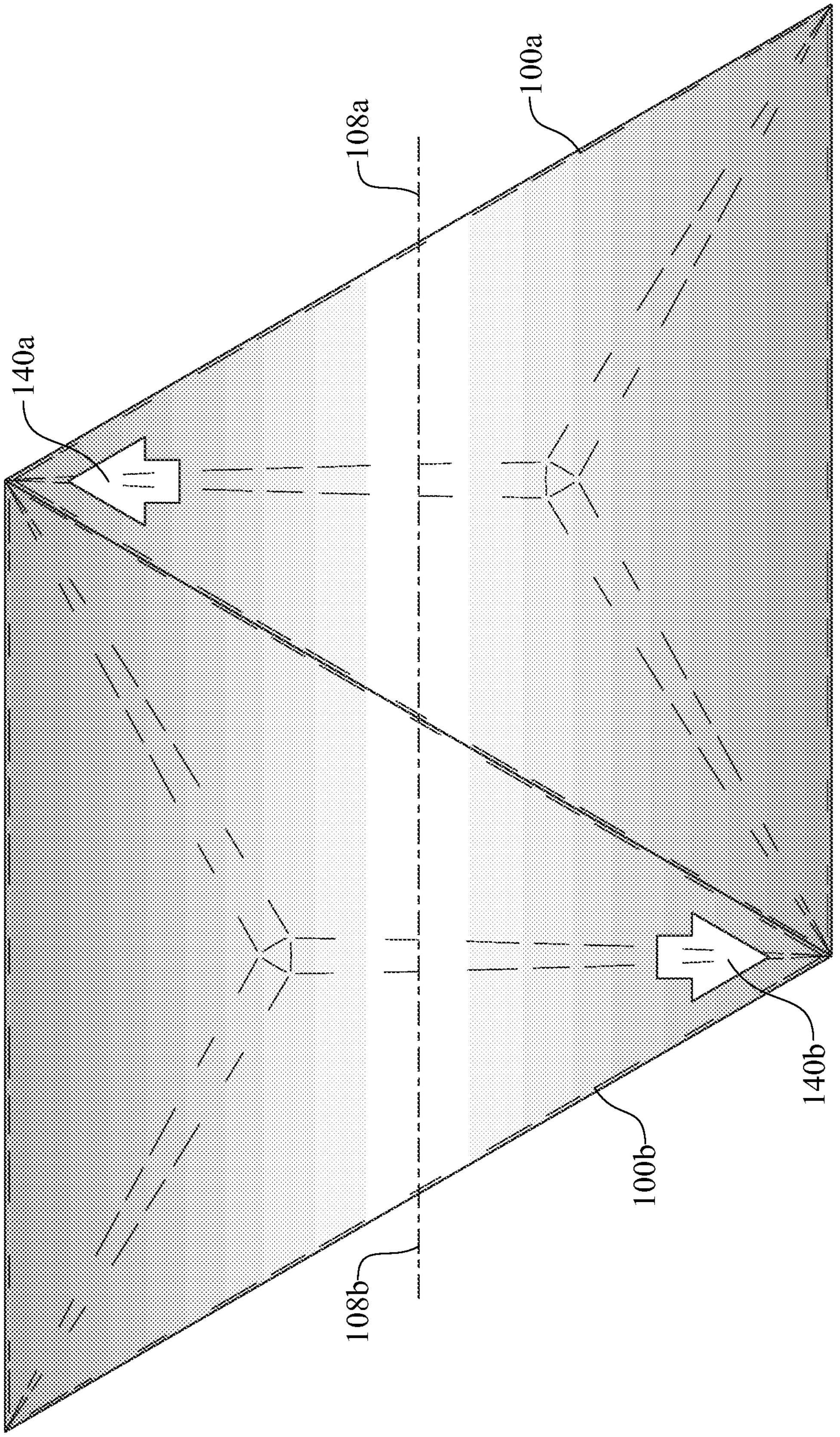
FIG. 15 presents two interconnected and oppositely oriented geometric light panels and the respective panel light shading orientation denoted by the dashed line.
Figure 16:
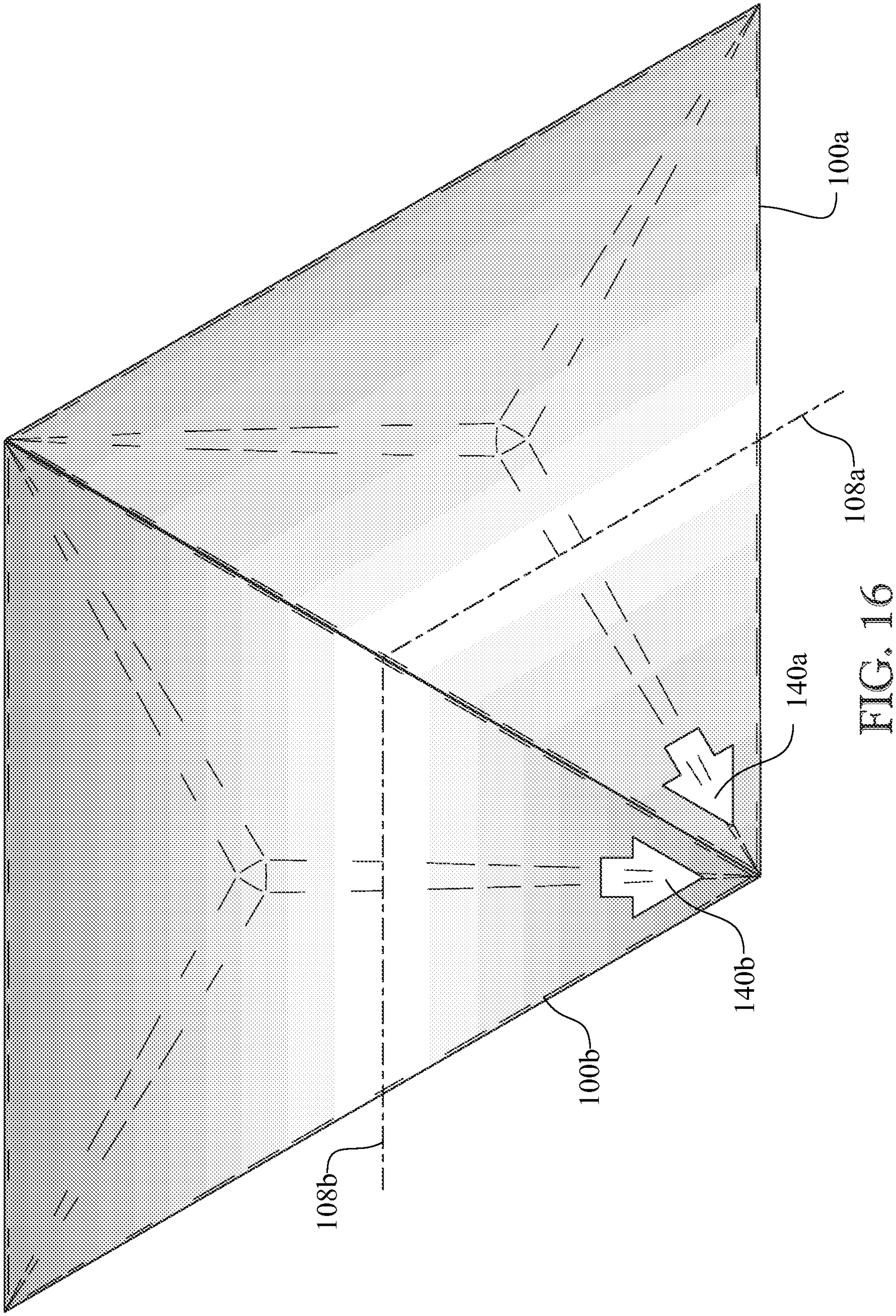
FIG. 16 presents two interconnected and substantially unidirectional oriented geometric light panels and the respective panel light shading orientation denoted by the dashed line.

When a plurality of light panel assemblies 100 are interconnected with rigid bridge connectors 180 and form a light display system, each light panel assembly 100 responds to signals from the controller in the same manner. The LEDs 164, 166 are illuminated with the same intensity, color, and pattern and oriented identically with respect to the orientation arrow 140. Referring now to FIGS. 15-16, the orientation of the triangular light panel assemblies 100*a*, 100*b* determines the total visual light experience that a viewer enjoys. One panel 100*a* with respect to an adjacent panel 100*b*, will provide differing light patterns for differing panel orientations. As shown in FIG. 15, if the triangular panels 100*a*, 100*b* are oppositely oriented, the color patterns will align along the colinear broken lines 108*a* and 108*b* as illustrated. However, if the triangular panels 100*a*, 100*b* are abutted apex to apex, the color pattern lines 108*a*, 108*b* are no longer colinear and will have a different appearance as illustrated by the broken lines 108*a* and 108*b* in FIG. 16. With this knowledge, a user can create a multitude of visual effects by re-orienting the triangular light panels 100.

To interconnect a plurality of triangular light panel assemblies, the controller 200 is placed at one side 121 of a first triangular light panel 100. The side 121 chosen should be a side that will be at the external periphery of the arrangement shape of the system of triangular light panels 100. One of the plugs 184 of a rigid bridge connector 180 engages the receptacle 208 at the bottom of the controller 200 and the other plug 184 engages the receptacle 174 at one side 121 of the triangular light panel 100, thus holding the controller against the side of the triangular light panel. From the first triangular light panel assembly 100 additional light panel assemblies 100 are interconnected wherein at least a second light panel assembly 100 is adjacently abutted to a free side of the first triangular light assembly 100 and a second rigid bridge connector 180 (acting as an output from the first triangular light assembly 100) is engaged with the adjacent receptacles 174 of the two light panels. The rigid bridge connectors 180 are oriented such that the flow of electrical signals is always away from the controller. Additional triangular light panels 100 can be added in like manner with each triangular light panel being restricted to having one input and two outputs.

While each of the receptacles 174 in the base of a triangular light panel assembly 100 is identical and can be used interchangeably, at any one time only one connector receptacle 174 can be used as a power/signal input and the remaining receptacles 174 are then relegated to an output function to a subsequent light panel assembly 100 if so desired. To function properly, a light panel assembly 100 can have only one input. Optionally, the connector plugs 184 can be color-coded or otherwise visually coded to identify the directional biasing of the electrical signals to aid the installer in maintaining a desired input/output configuration for each light panel assembly 100.

The light panel assemblies 100 can be physically configured in many unique arrangements limited only by the number of light panel assemblies 100 used. In one embodiment, each controller can service up to 8 light panel assemblies connected thereto so long as each individual light panel assembly has only one bridge connector 180 attached thereto functioning as an input of electrical power and signal for the light panel assembly 100. One or more of the remaining two connector receptacles 174 of the light panel assembly 100 can then be connected to downstream light panel assemblies 100 wherein the remaining connector receptacles 174 function as outputs to the downstream light panel assemblies 100 interconnected thereto.

As previously discussed, each individual light panel assembly 100 includes on the bottom thereof an orientation arrow 140. One of the functional modes of the individual light panel assemblies is a lateral visible flow of an illumination pattern of color or series of colors from one side 121 of a light panel assembly 100 to the opposite side 121 thereof, from the apex 138 to a base opposite thereof, or from the base to the opposite apex. The orientation arrow 140 is indicative of such a flow since the controller 200 will cause the light pattern of each individual light panel assembly 100 to flow in the same direction for each light panel with respect to the orientation arrow 140. Thus, a user can design a multitude of arrangements of different patterns by first arranging the triangular light panels 100 into a unique geometric formation and then varying the light patterns experienced by altering the orientation of each triangular light panel within that geometric formation.

Samples of individual physical configurations and their respective interconnections are illustrated in FIGS. 17-35. These figures illustrate sample physical arrangements of individual light panel assemblies within the system to create different visual patterns.

Figure 17:
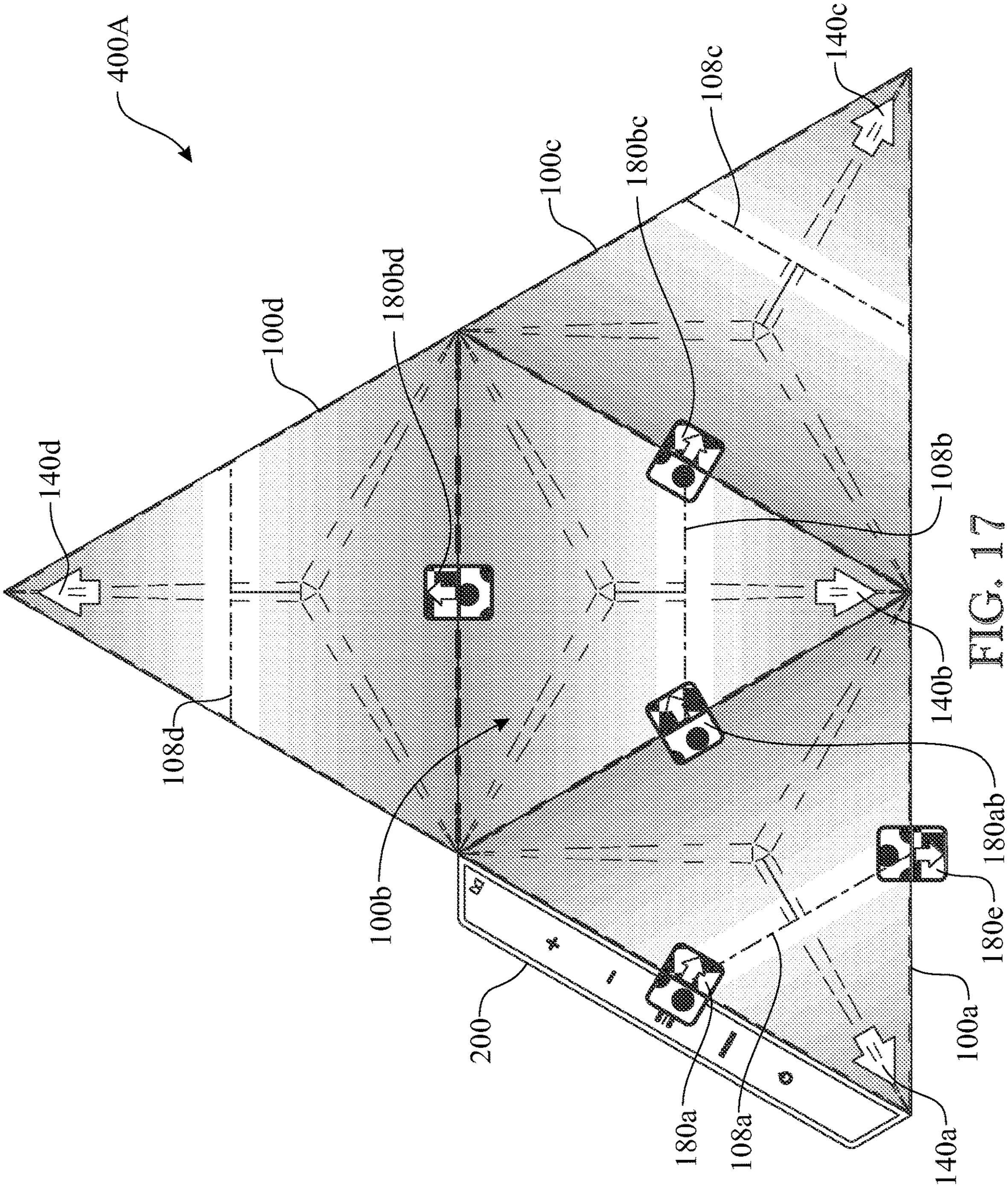
FIG. 17 presents a first configuration of four geometric panels and a controller interconnected to form a triangle and their respective connector orientations and light shading orientations.
Figure 18:
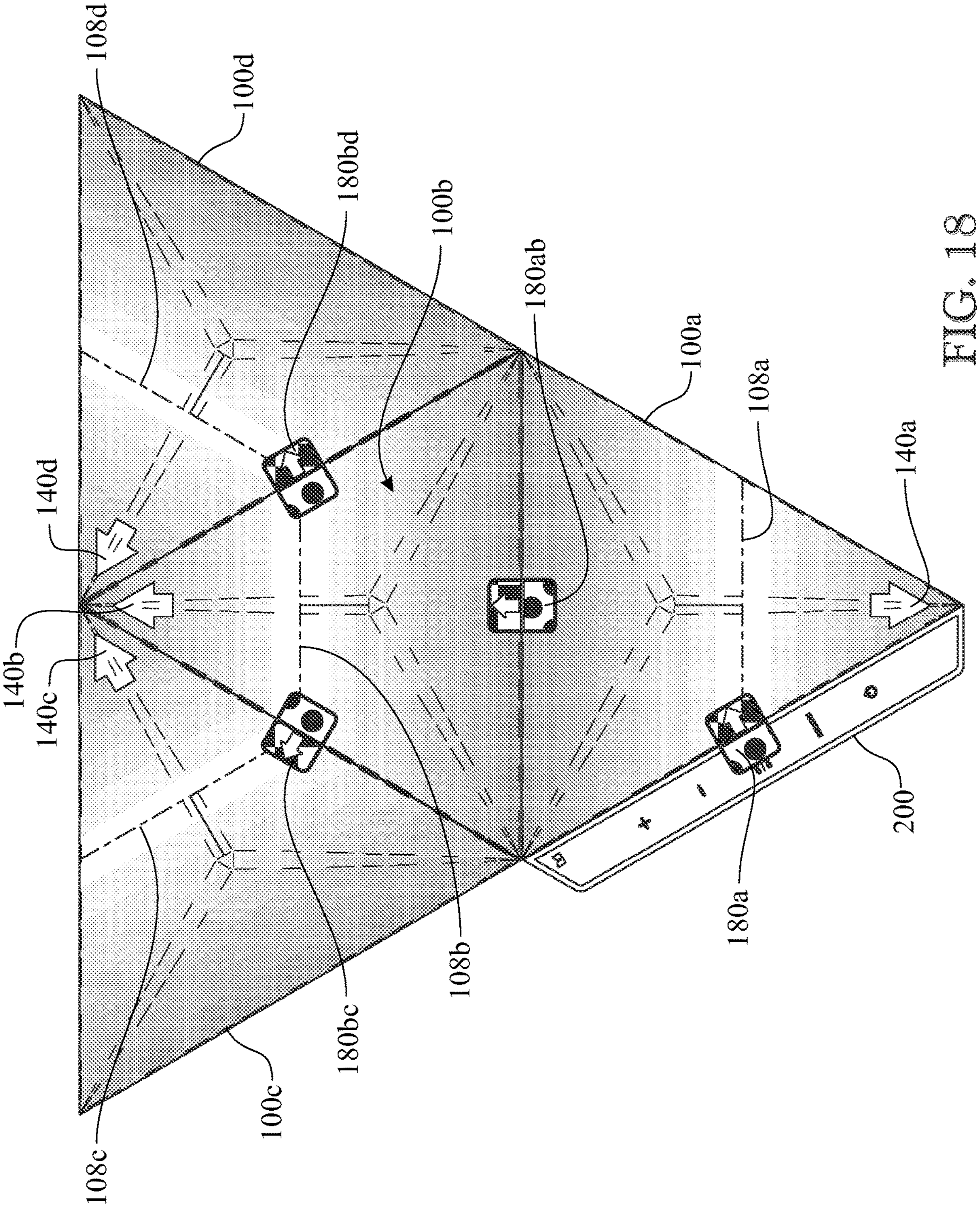
FIG. 18 presents a second configuration of four geometric panels and a controller interconnected to form a triangle and their respective connector orientations and light shading orientations.

As a first example, FIGS. 17-18 illustrate lighting systems 400A and 400B respectively wherein each system forms an equilateral triangle utilizing four interconnected light panel assemblies 100*a*-100*d* and one controller 200. As illustrated in FIG. 17, each of the peripheral triangular light panel assemblies 100*a*, 100*c*, and 100*d* forming the periphery of the triangle are oriented with the respective orientation arrows 140*a*, 140*c*, and 140*d* positioned at the three corners of the triangle with the fourth triangular light panel assembly 100*b* positioned in the middle of the triangle with its directional arrow oriented toward the base of the triangle. As can be seen in FIG. 17, the broken lines 108*a*-108*d* representing potential light flow patterns are distinctly separated and non-contiguous one from the others. The controller 200 is positioned adjacent the lower left side of light panel assembly 100*a*. The controller 200 and the light panel assembly 100*a* are interconnected with a bridge connector 180*a*. The bridge connector 180*a* is oriented (biased) such that the electrical signals flow from the controller 200 to the light panel assembly 100*a*. A bridge connector 180*e* can be utilized to add additional light panel assemblies 100 as desired. The light panel assembly 100*b* is oriented with the directional arrow pointed down and is interconnected with light panel assembly 100*a* with bridge connector 180*ab*. The bridge connector 180*ab* is oriented such that the electrical bias of the bridge connector 180*ab* permits the flow of electrical signal only from the light panel assembly 100*a* to the light panel assembly 100*b*. The light panel assemblies 100*c* and 100*d* are abutted to the remaining sides of the light panel assembly 100*b* and electrically interconnected with bridge connectors 180*bc* and 180*bd* respectively. The bridge connectors 180*bc* and 180*bd* or oriented such that their respective electrical biases direct the flow of electrical signals from the light panel assembly 100*b* to the light panel assemblies 100*c* and 100*d* respectively.

The system configuration wherein the rigid bridge connectors 180 incorporate its individual connectors 184 at right angles to a surface to which the light system is mounted permits a front-loading methodology. The front-loading methodology facilitates the disengagement of a light panel assembly 100 from the system by drawing the light panel assembly 100 perpendicularly away from the mounting surface. This is opposed to other mounting systems wherein the connectors are inserted into the sides of the light panels thus creating a more time consuming and difficult procedure. All installation and connection operations occur perpendicular to the mounting surface. This greatly eases installation and removal and reduces potential damage to the wall or to the light panel assemblies 100 and bridge connectors 180. In this manner a single light panel assembly 100, multiple light panel assemblies 100, or the entire system are easily removed from the mounting surface.

FIG. 18 illustrates a second equilateral triangle lighting system 400B here shown as an inverted triangle. Those practiced in the art will recognize that the interconnected system 400B can be oriented in any direction. For the lighting system 400B, the light panel assembly 100*a* is oriented with its orientation arrow 140*a* pointed down and the controller 200 again abutting the left side of the light panel assembly 100*a*. The controller 200 and the light panel assembly 100*a* are electrically interconnected with a bridge connector 180*a*. The bridge connector 180*a* is oriented such that its electrical bias only permits the flow of electrical signals from the controller 200 to the light panel assembly 100*a*. The base of light panel assembly 100*b* is abutted to and electrically interconnected with the upward oriented base of the light panel assembly 100*a* and electrically interconnected with a bridge connector oriented so that its electrical bias only permits the flow of electrical signals from the light panel assembly 100*a* to the light panel assembly 100*b*. The orientation arrow 140*b* of the light panel assembly 100*b* is pointed upward directly opposite the direction of the orientation arrow 140*a* of the light panel assembly 100*a*. Light panel assemblies 100*c* and 100*d* are abutted to the left and right sides of the light panel assembly 100*g* respectively and are likewise electrically interconnected to the light panel assembly 100*b* with bridge connectors 180*bc* and 180*bd* respectively. The bridge connectors 180*bc* and 180*bd* are also oriented such that their respective electrical bias only permits the flow of electrical signals from light panel assembly 100*b* to light panel assembly 100*c* and light panel assembly 100*d* respectively. The light panel assemblies 100*b*, 100*c*, and 100*d* are oriented such that the apexes as represented by orientation arrows 140*b*, 140*c*, and 140*d* meet at a top midpoint of the upper edge of the equilateral triangle of the system 400B. The reorientation of the light panel assemblies 100*a*-100*d* create a completely different light flow pattern compared to the light flow pattern of the light system 400A as evidenced by the contiguousness of the dashed lines 108*b*-108*d*. In this manner, different lighting patterns can be created to vary the visual aspect of the light systems even while maintaining the same or similar physical pattern of the light panel assemblies 100.

Figure 19:
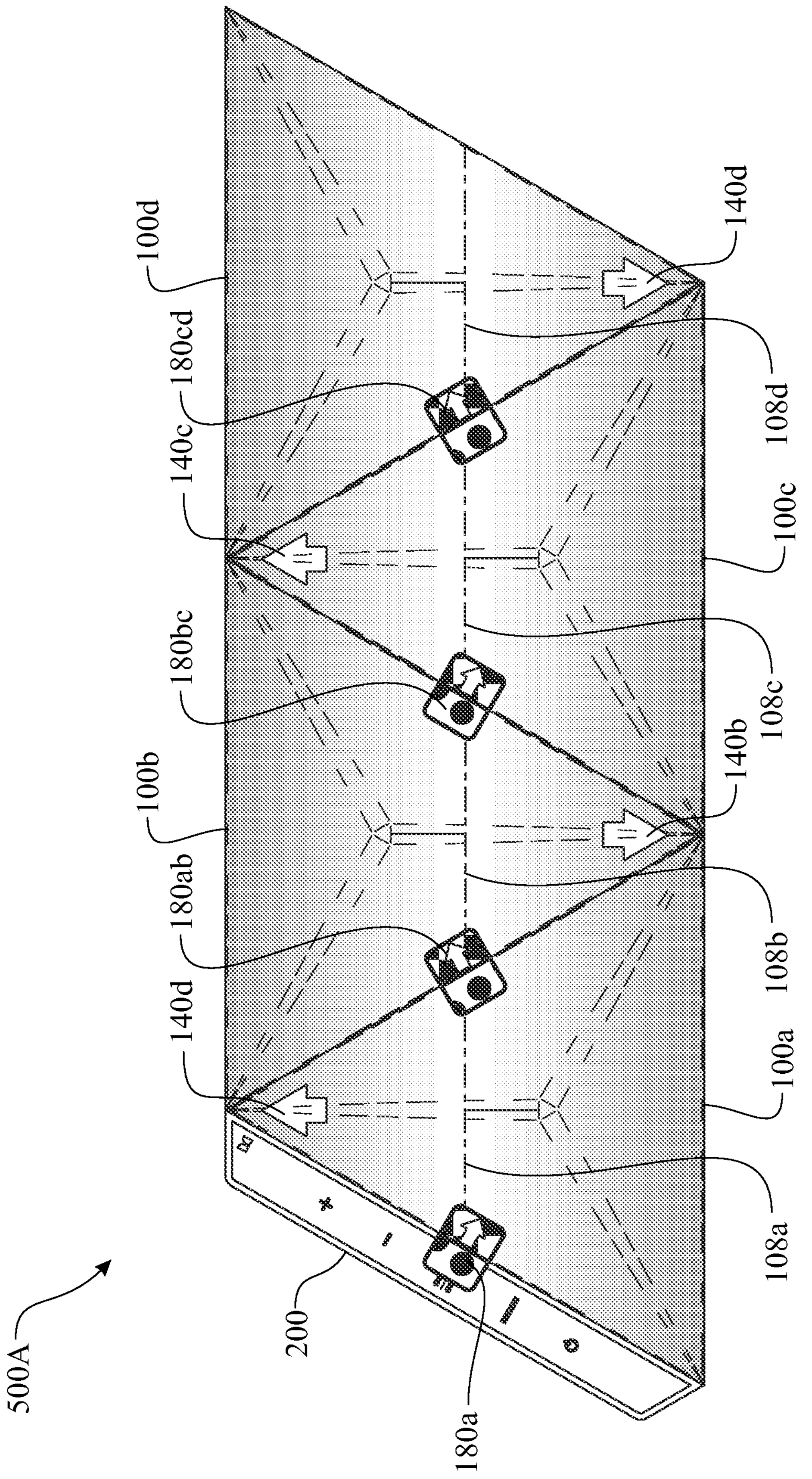
FIG. 19 presents a first linear arrangement of alternating orientation geometric panels and a controller.
Figure 20:
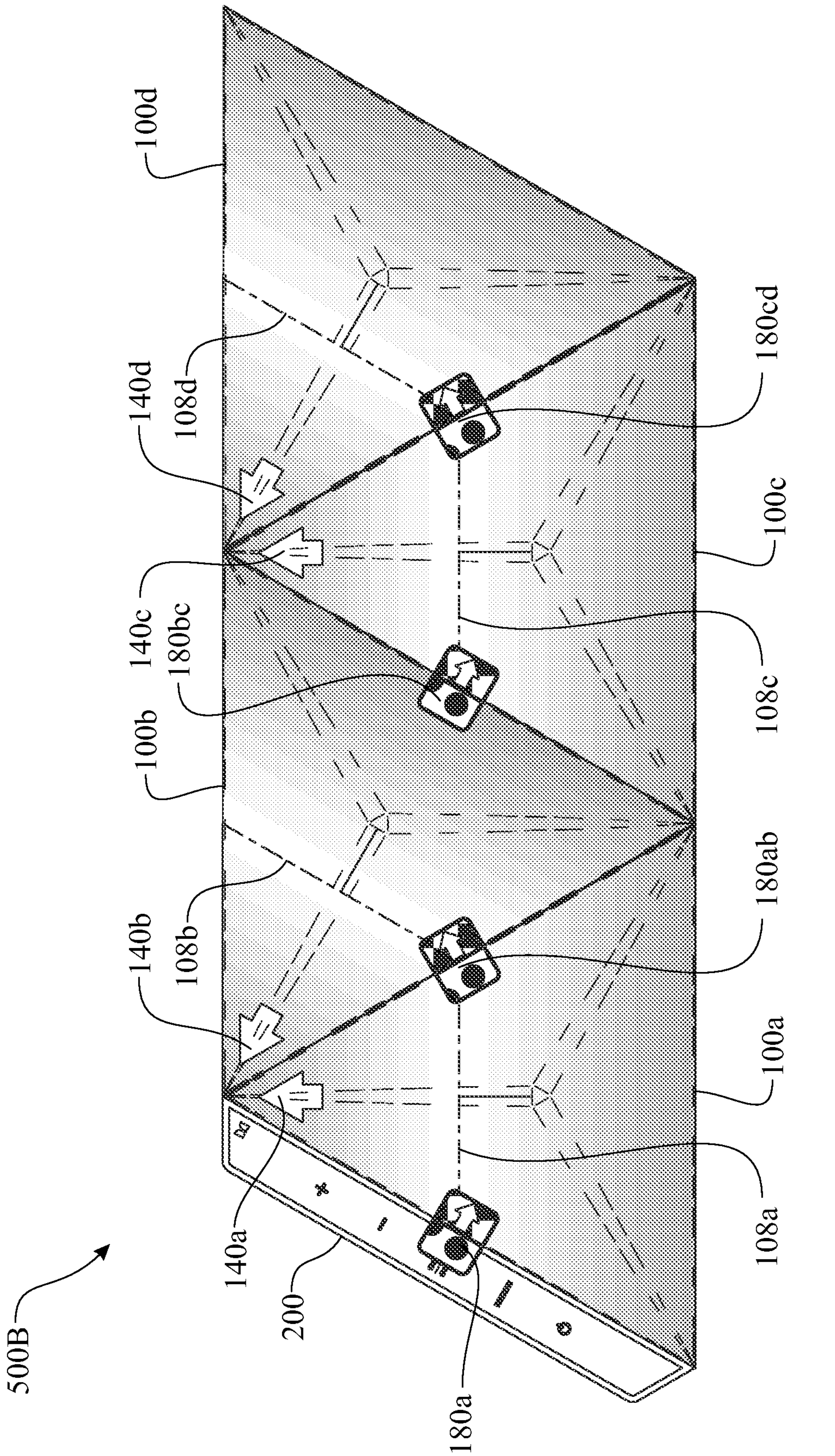
FIG. 20 presents a second linear arrangement of substantially unidirectional orientation geometric panels and a controller.
Figure 21:
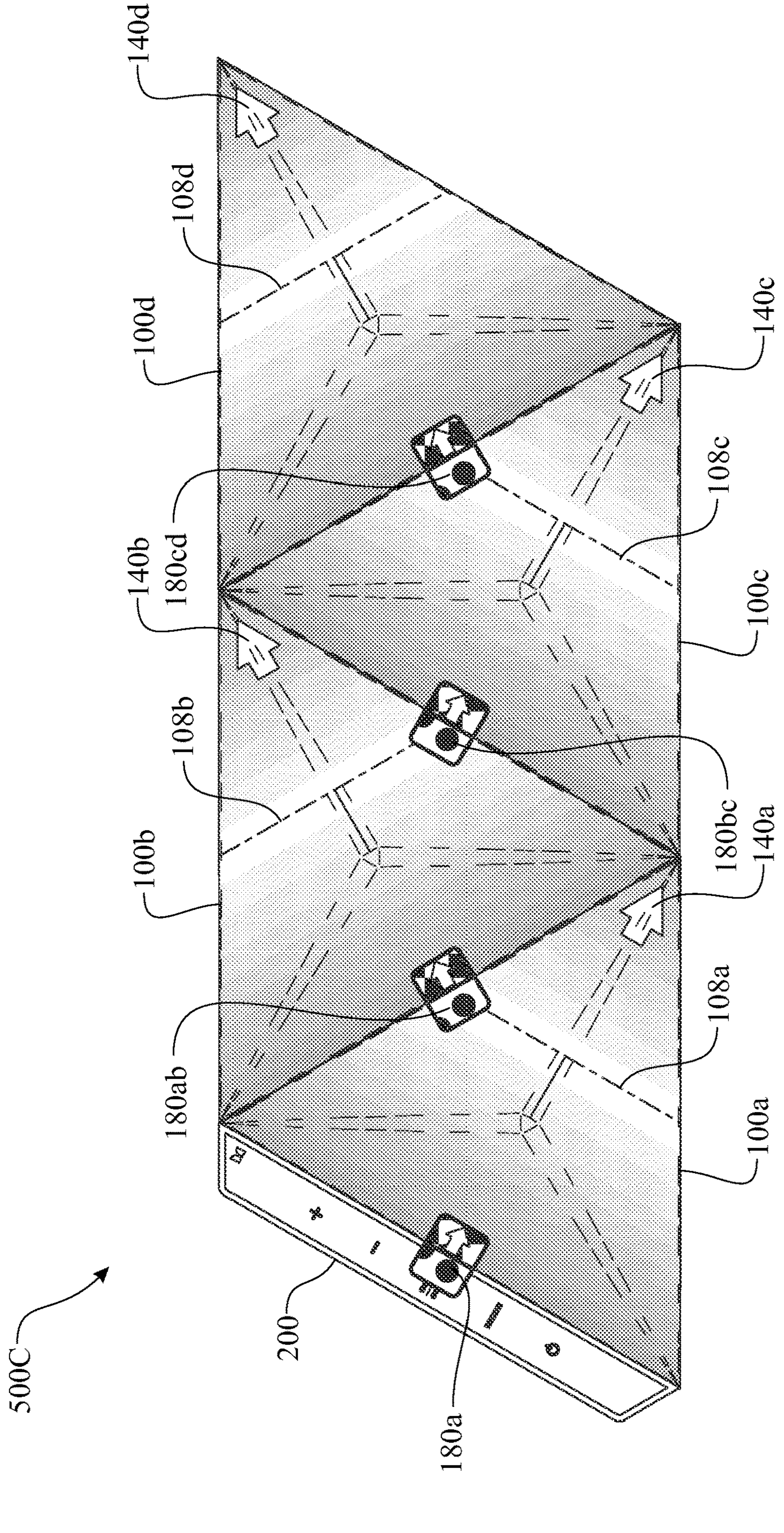
FIG. 21 presents a third linear arrangement of geometric panels with alternating orientations and a controller.
Figure 22:
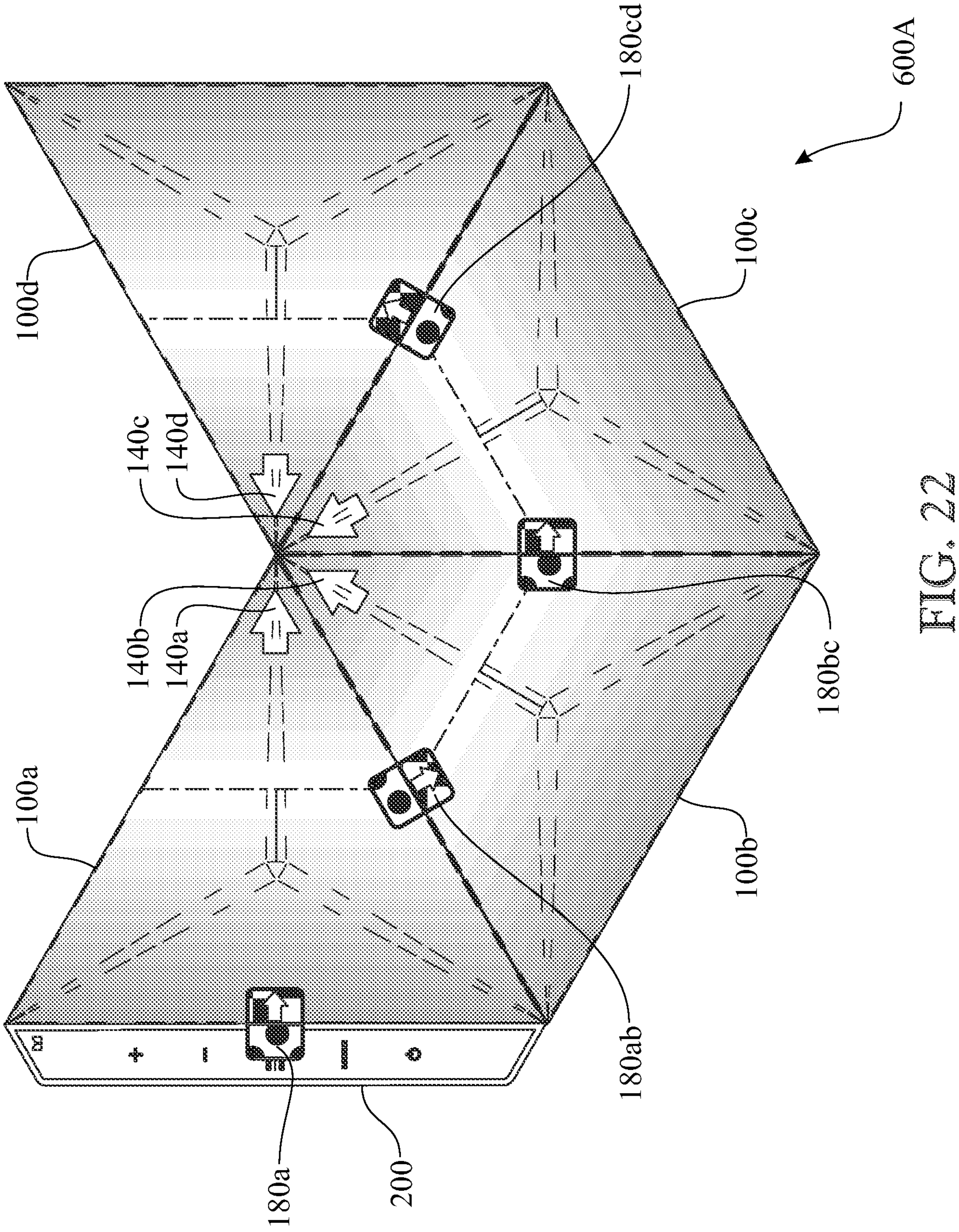
FIG. 22 presents four geometric panels with their apexes and orientation arrows adjoining at a central proximal point.
Figure 23:
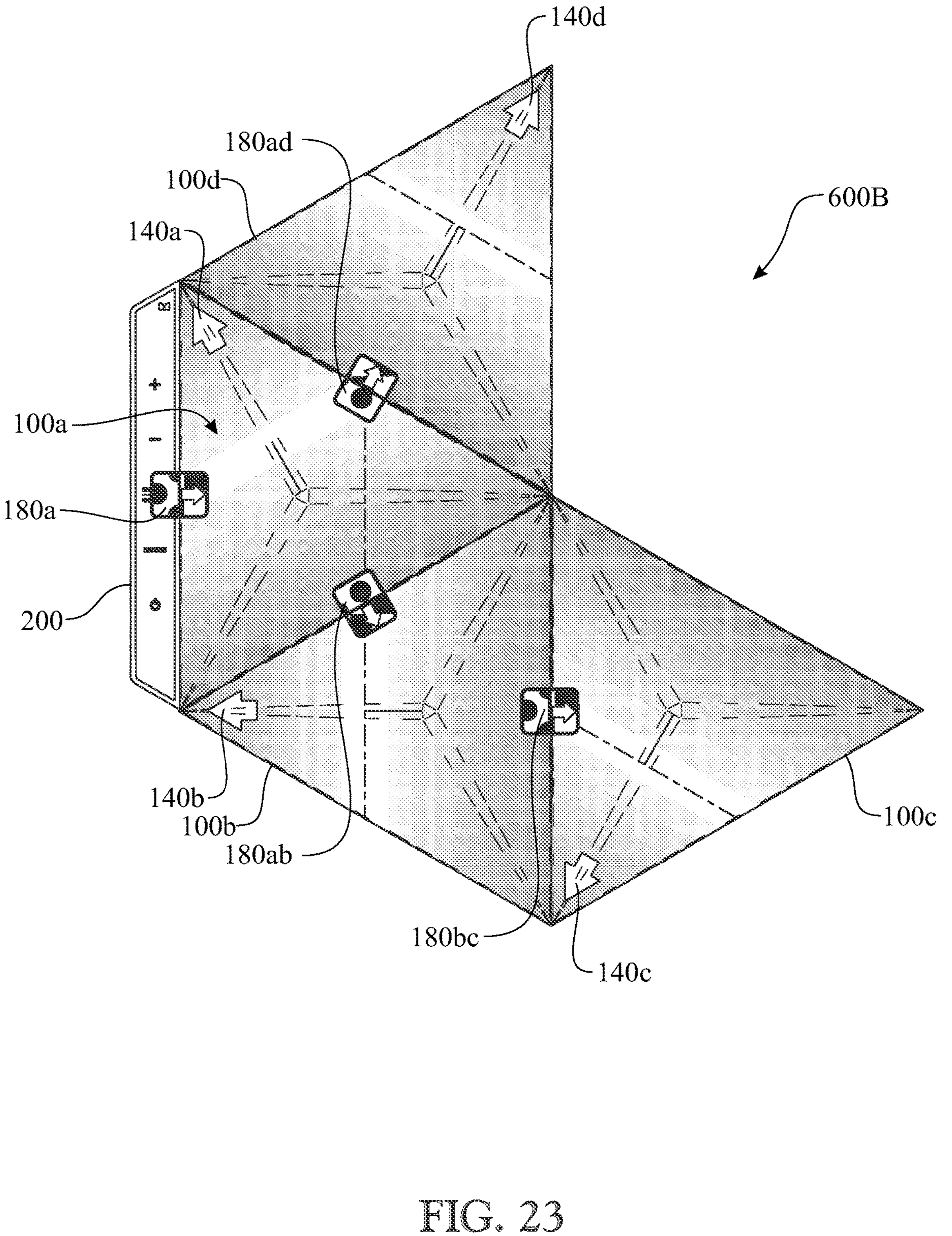
FIG. 23 presents four geometric panels with apexes and orientation arrows point to a distal periphery of the arrangement.
Figure 24:
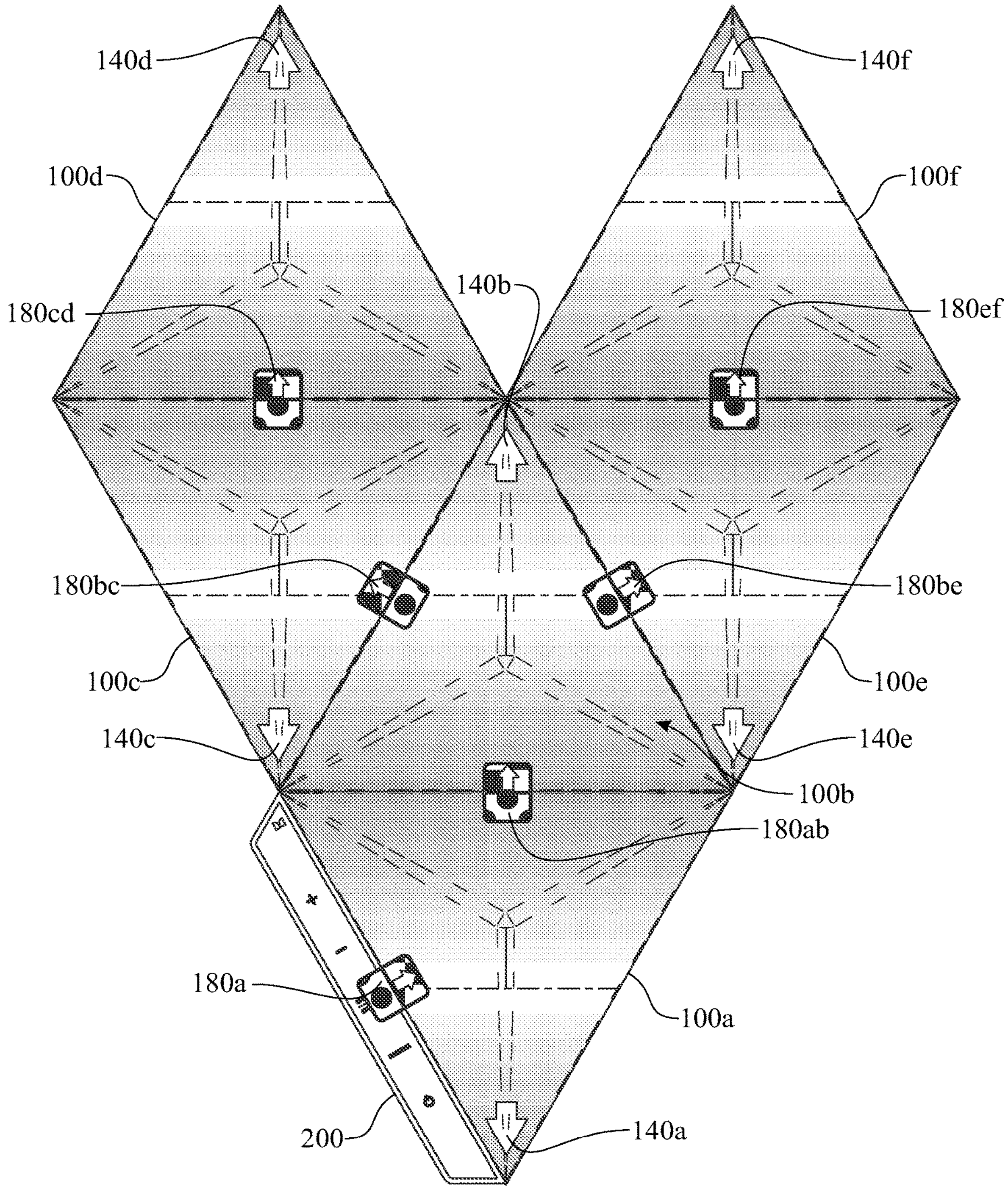
FIG. 24 presents an arrangement of six geometric panels with parallel (see broken lines) shading orientation.
Figure 25:
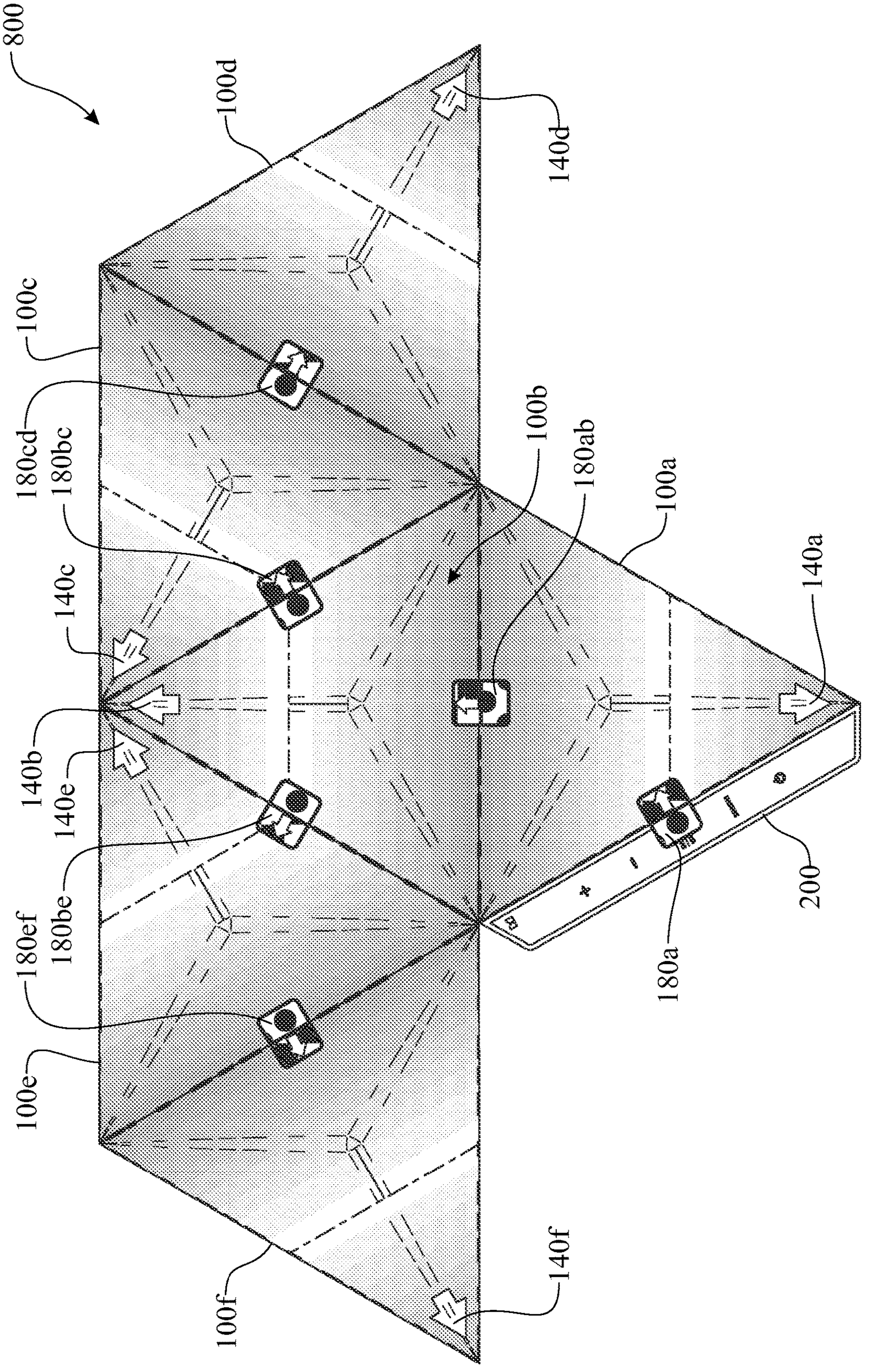
FIG. 25 presents an alternate arrangement of six geometric panels.
Figure 26:
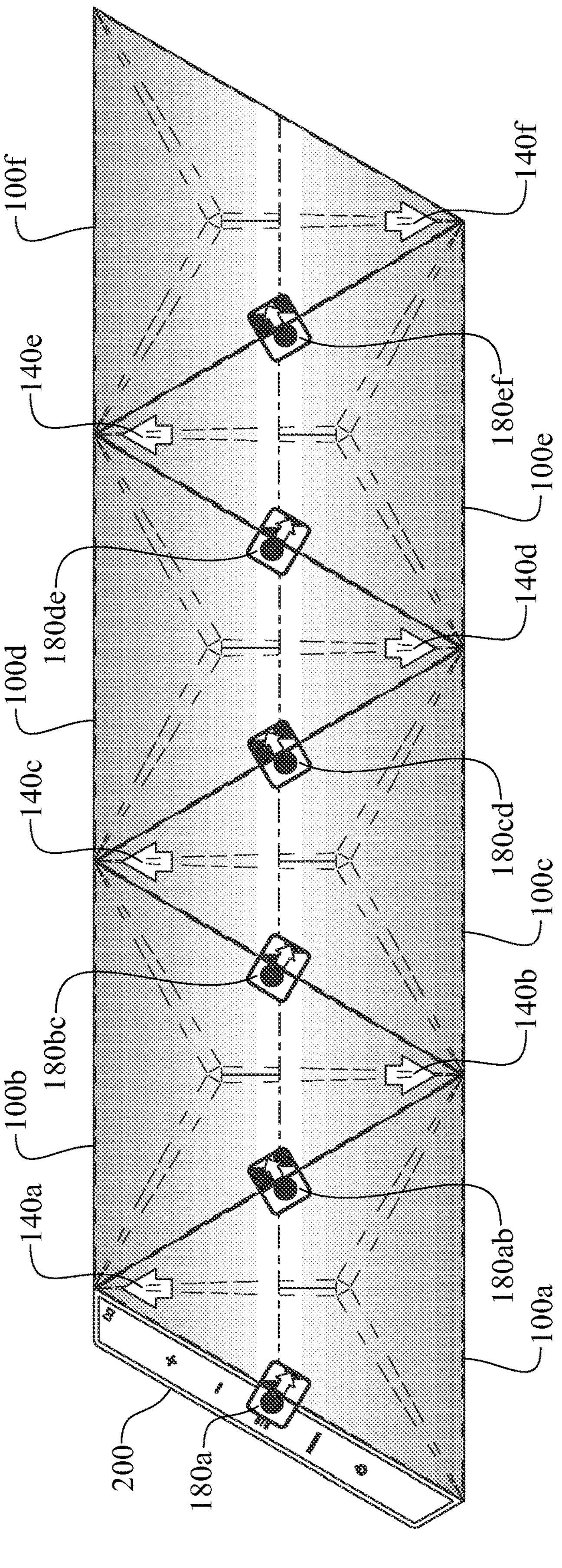
FIG. 26 presents a linear arrangement of six geometric panels and oppositely oriented one from the next.

Turning now to FIGS. 19-21 wherein three linear lighting system configurations 500A-500C respectively are illustrated. This configuration also comprises four triangular light panel assemblies 100*a*-100*d* and a controller 200. In the light system 500A as presented in FIG. 19, the panel assemblies 100*a*-100*d* are linearly arranged left to right such that the respective apexes, as represented by the respective orientation arrows 140*a*-140*d*, are alternated up and down. In this manner, the dashed lines 108*a*-108*d* representing the lighting pattern are linearly contiguous from left to right. The first light panel assembly 100*a* has affixed to its left side a controller 200. The controller 200 and the light panel assembly 100*a* are electrically interconnected with a bridge connector 180*a*. The bridge connector 180*a* is oriented such that its electrical bias only permits the flow of electrical signals from the controller 200 to the light panel assembly 100*a*. The light panel assemblies 100*a*-100*d* are electrically interconnected with bridge connectors 180*ab*-180*cd* respectively wherein the bridge connectors 180*ab*-180*cd* are oriented such that the electrical bias of the connectors only permit the flow of electric signals along a path from the controller 200 to light panel 100*d*.

FIGS. 20-21 present light configurations 500B and 500C respectively which are variations of the light configuration 500A presented in FIG. 19. The only difference between the configurations 500A-500C is the respective rotational orientations of the light panel assemblies 100*a*-100*d*. Here as in other configurations, the mounting brackets 190 for each respective light panel assembly has been affixed to a surface. To rotationally reorient the light panel assemblies 100*a*-100*d*, the assemblies 100*a*-100*d* are disengaged from the respective bridge connectors 180*a*-180*cd* and disengaged from the magnetic force of the mounting bracket 190. The subject light panel assemblies then can be rotated and re-engaged with the respective mounting brackets 190 and bridge connectors 180*a*-180*cd* to create a new lighting pattern while maintaining the physical linear arrangement of the light panel assemblies 100*a*-100*d*.

FIGS. 22-29 illustrate additional light panel system configurations. Each of the system configurations comprises a controller 200 which is connected to a first light panel assembly 100*a* utilizing a rigid bridge connector 180. The bridge connector 180 is electrically biased to pass electrical signals in one direction only. The bridge connectors 180*xx* (general designation) are all electrically biased and are always utilized to connect adjacent ones of the light panel assemblies 100*x* (general designation) one to the other. The connectors 180*xx* are always oriented to carry the electrical signals away from the controller wherein there is only one input to a light panel assembly 100*x*, but there may be multiple connections to transmit electrical signals to adjacent light panel assemblies 100*x*. The configurations illustrated are representative only and not intended to be limiting. The only limiting factor is the capacity of the controller with respect to the number of light panel assemblies that may be interconnected and controlled therewith. In the configurations illustrated herein a controller 200 can control a maximum of eight light panel assemblies 100. However, those practiced in the art will realize that variations of the controller consistent with the disclosures herein may have the capacity to control more than eight light panel assemblies 100.

Figure 27:
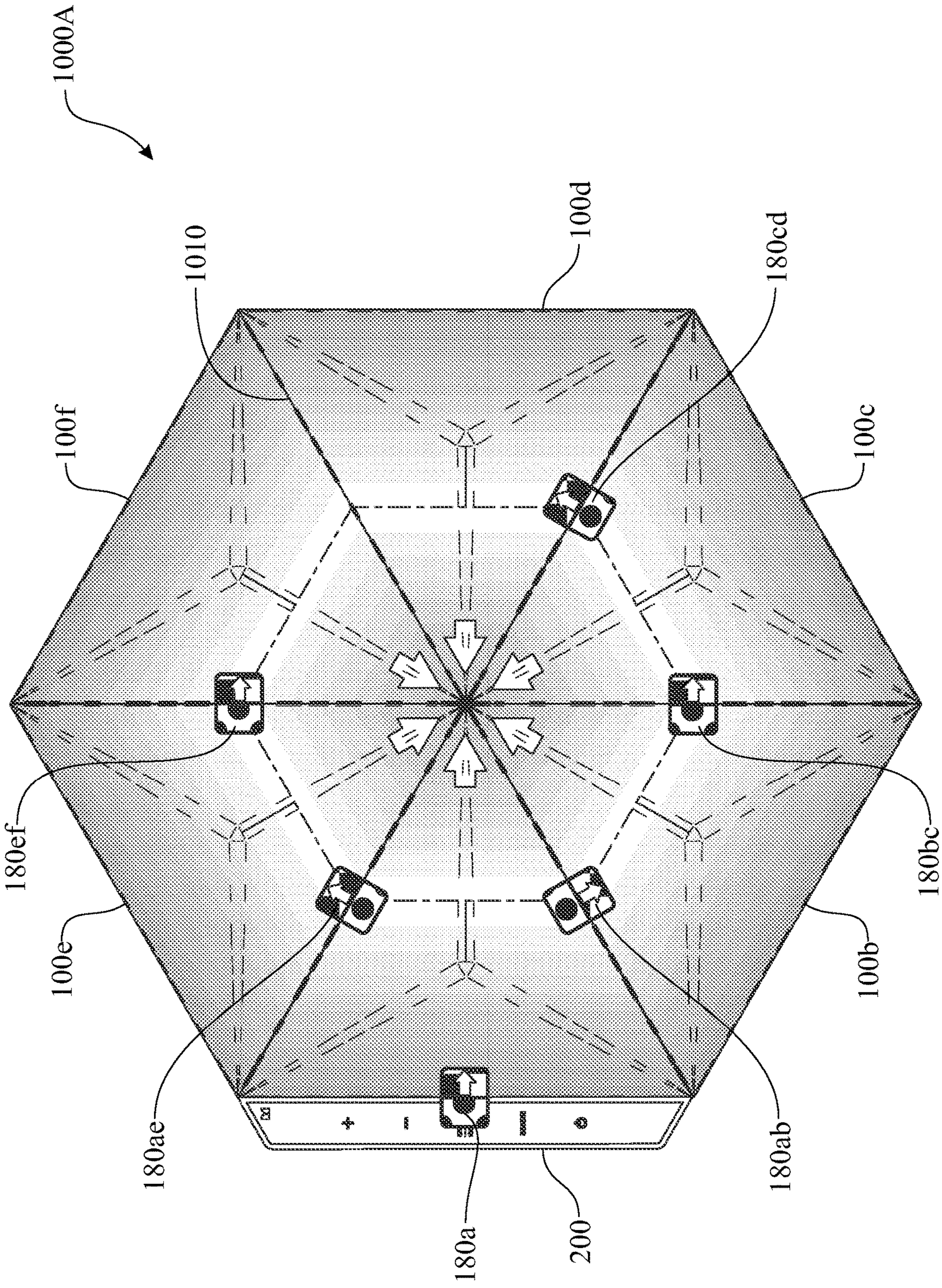
FIG. 27 presents a hexagonal arrangement of six geometric panels all oriented toward a central proximal point.
Figure 28:
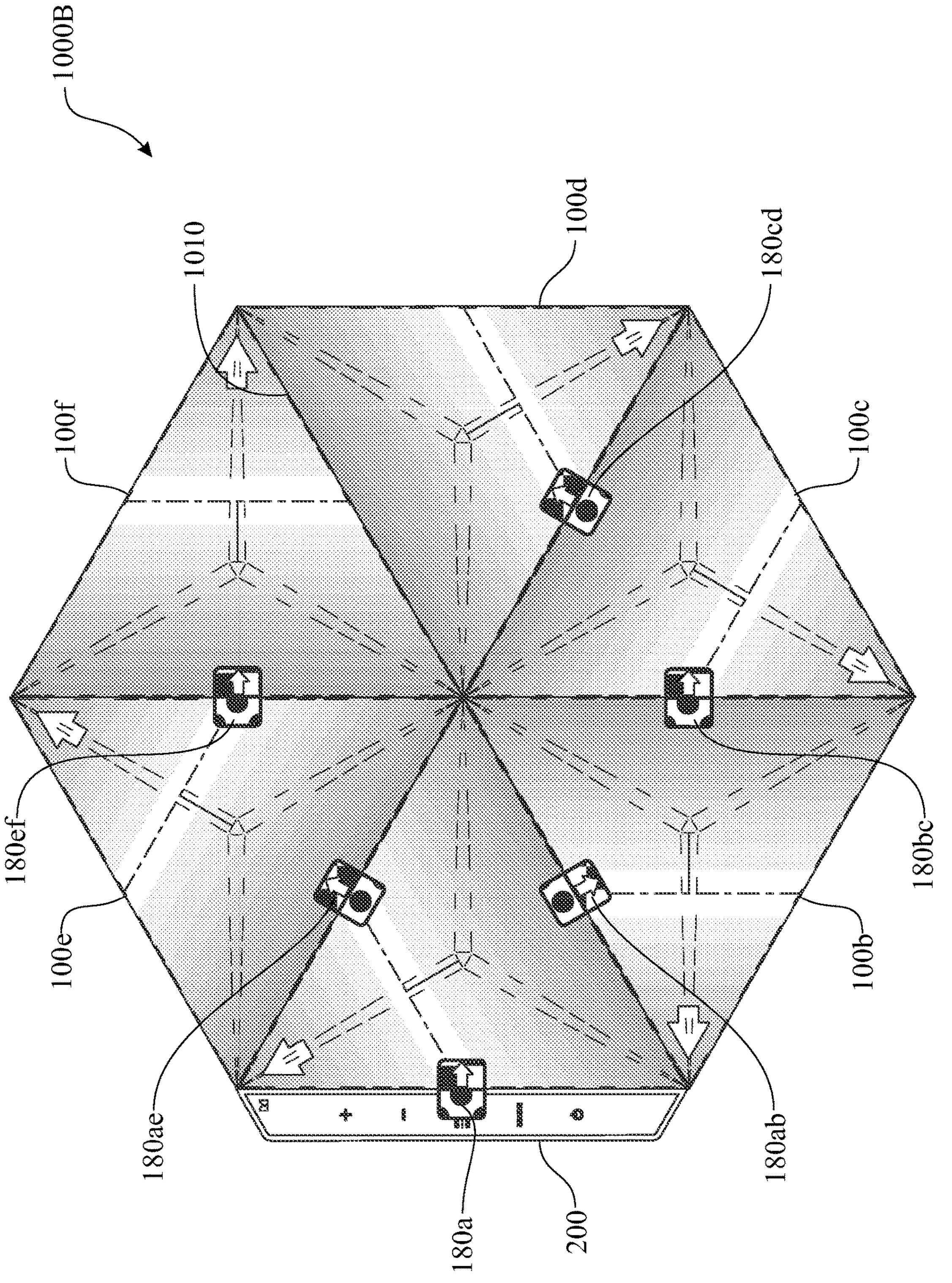
FIG. 28 presents a hexagonal arrangement of six geometric panels all oriented to a distal periphery of the hexagon.
Figure 29:
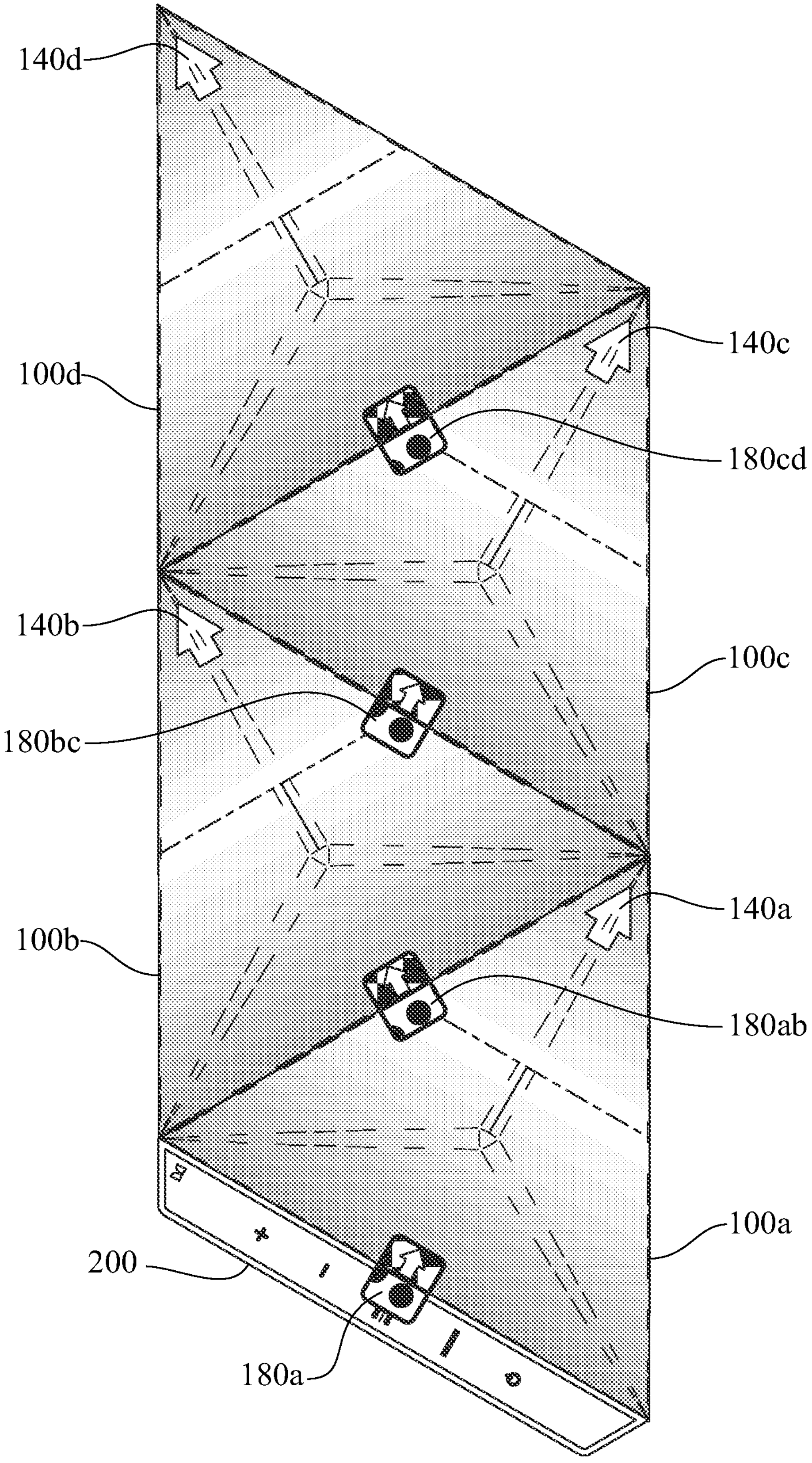
FIG. 29 presents an arrangement of eight geometric panels, a controller, and their respective interconnections.

Additionally, and as illustrated in FIGS. 27-28, the physical pattern of two arrangements 1000A and 1000B can be physically identical yet different lighting effects can be facilitated by reversing the orientation of the individual light panels 100. For example, in FIG. 20 the orientation arrows are pointed to a central proximal point of the arrangement wherein the light pattern flow would start at the distal ends of the individual light panel assemblies 100 and terminate at the central proximal point. The same physical arrangement 1000B, but wherein each light panel assembly 100 is oppositely oriented, the light flow pattern would start at the central proximal point and flow to the distal periphery of the geometric pattern.

Also, as illustrated in FIGS. 27-28, when a geometric arrangement of triangular light panels 100 essentially form a closed loop, the final two light panels 100*d* and 100*f* that are adjacent one to the other cannot be interconnected by a rigid connector 180. To do so would result in one of the triangular light panels receiving power and signal inputs from two connectors. Thus, the interface 1010 between those two adjacent light panels 100*d* and 100*f* must remain open and not electrically interconnected one to the other. In the configuration wherein the bridge connectors 180 are electrically bidirectional, the bidirectional connectors are able to detect if one light panel 100 receiving power/signal input from two connector and would then automatically disable the input of the connector furthest from the controller. This connector is identified through the detection of power degradation over the circuit.

Figure 30:
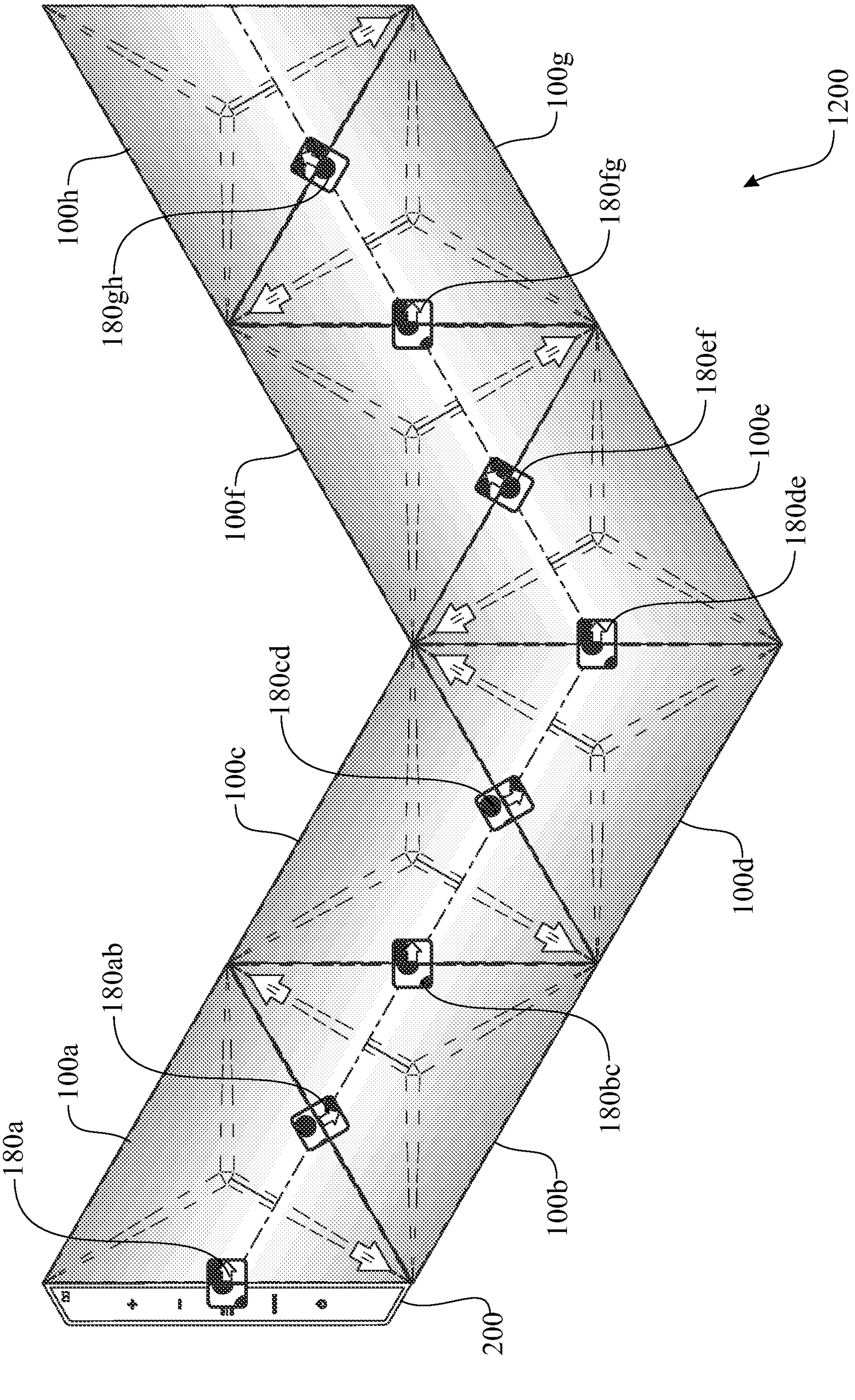
FIG. 30 presents an arrangement of eight geometric panels forming a "V", a controller, and their respective interconnections.
Figure 31:
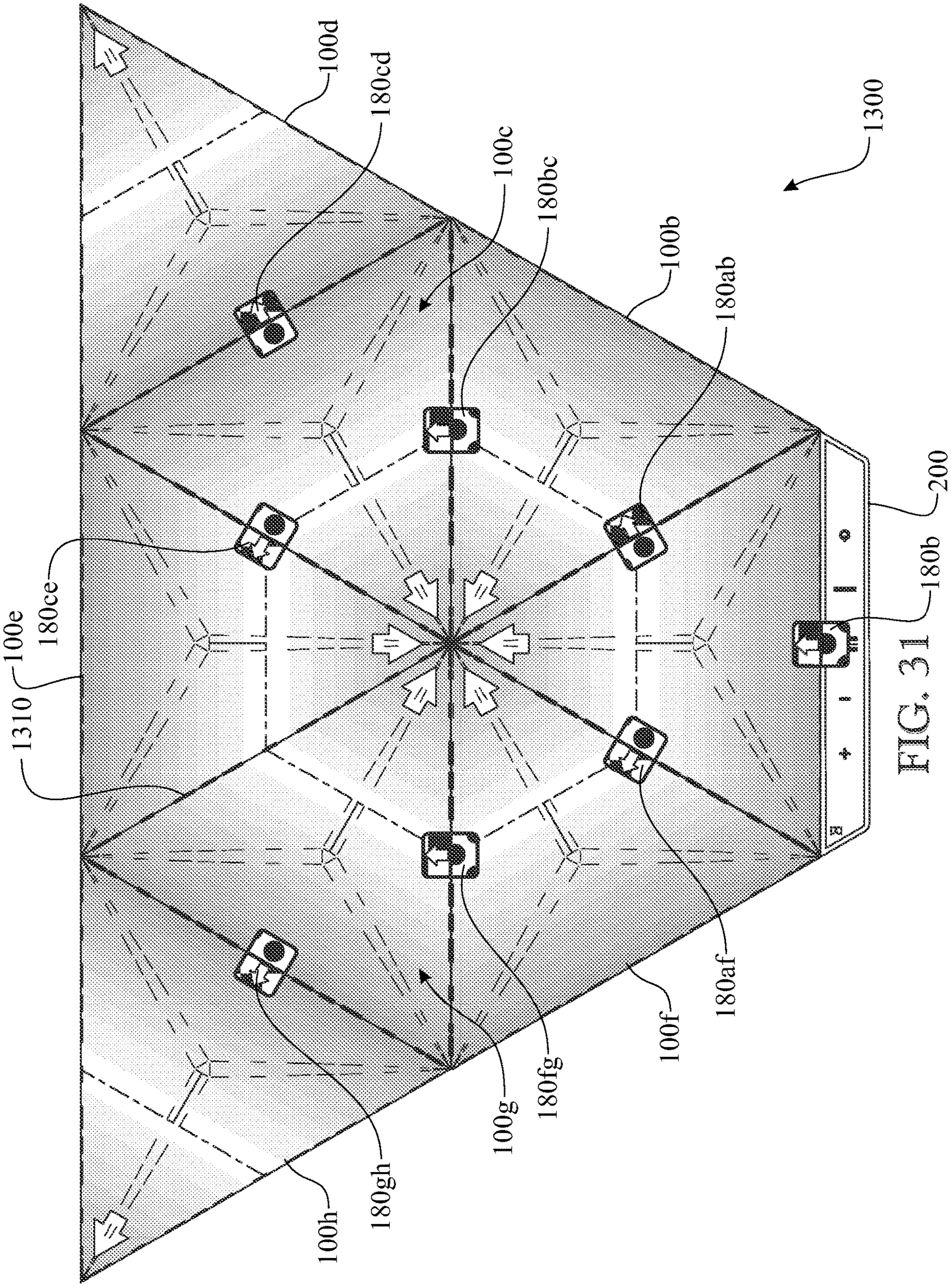
FIG. 31 presents an arrangement of eight geometric panels forming a frustum, a controller, and their respective interconnections.
Figure 32:
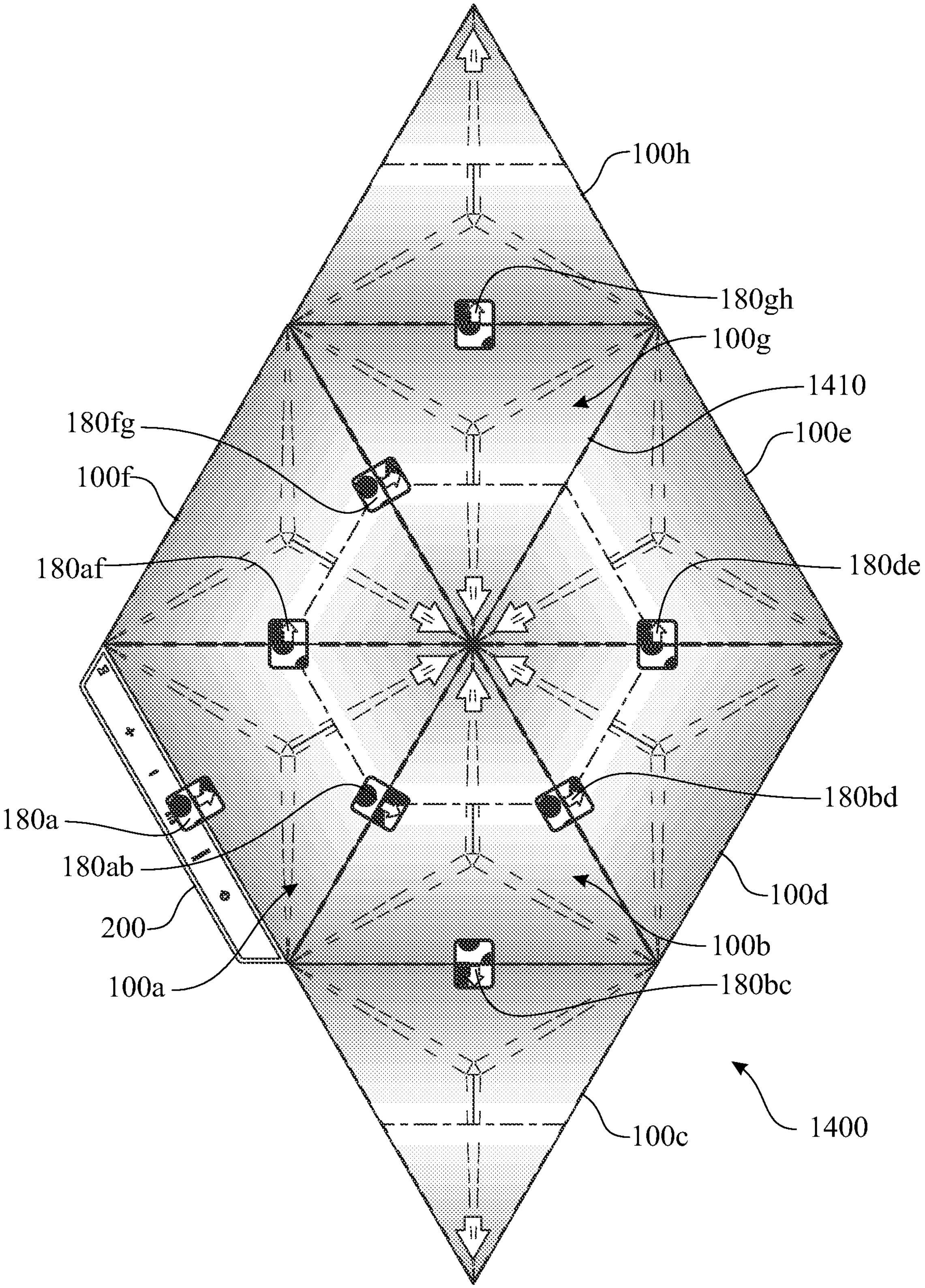
FIG. 32 presents an arrangement of eight geometric panels forming a diamond, a controller, and their respective interconnections.

FIGS. 30-32 illustrate larger system configurations 1200, 1300, 1400 wherein the system configurations 1200, 1300, 1400 comprise the maximum number (eight) of light panel assemblies 100*a*-100*f*. As in previous configurations, the controller 200 and the adjacent ones of the light panel assemblies 100*a*-100*f* are interconnected with directionally biased electrical rigid bridge connectors 180*xx*.

Additionally, because of the limitation to the number of light panel assemblies that can be connected to one controller, an application necessitating more than that number of light panel assemblies such as the formation of a series of individual letters spelling a word can be accomplished by utilizing more than one system. Each of the systems utilized in such an application would have its own controller such as the six-pointed star illustrated in FIG. 33. By pairing the controllers with a Wi-Fi network or directly to a portable device such as a smart phone, the entire arrangement can be controlled concurrently rather than individually and thus appear to have a seamless operation.

Figure 33:
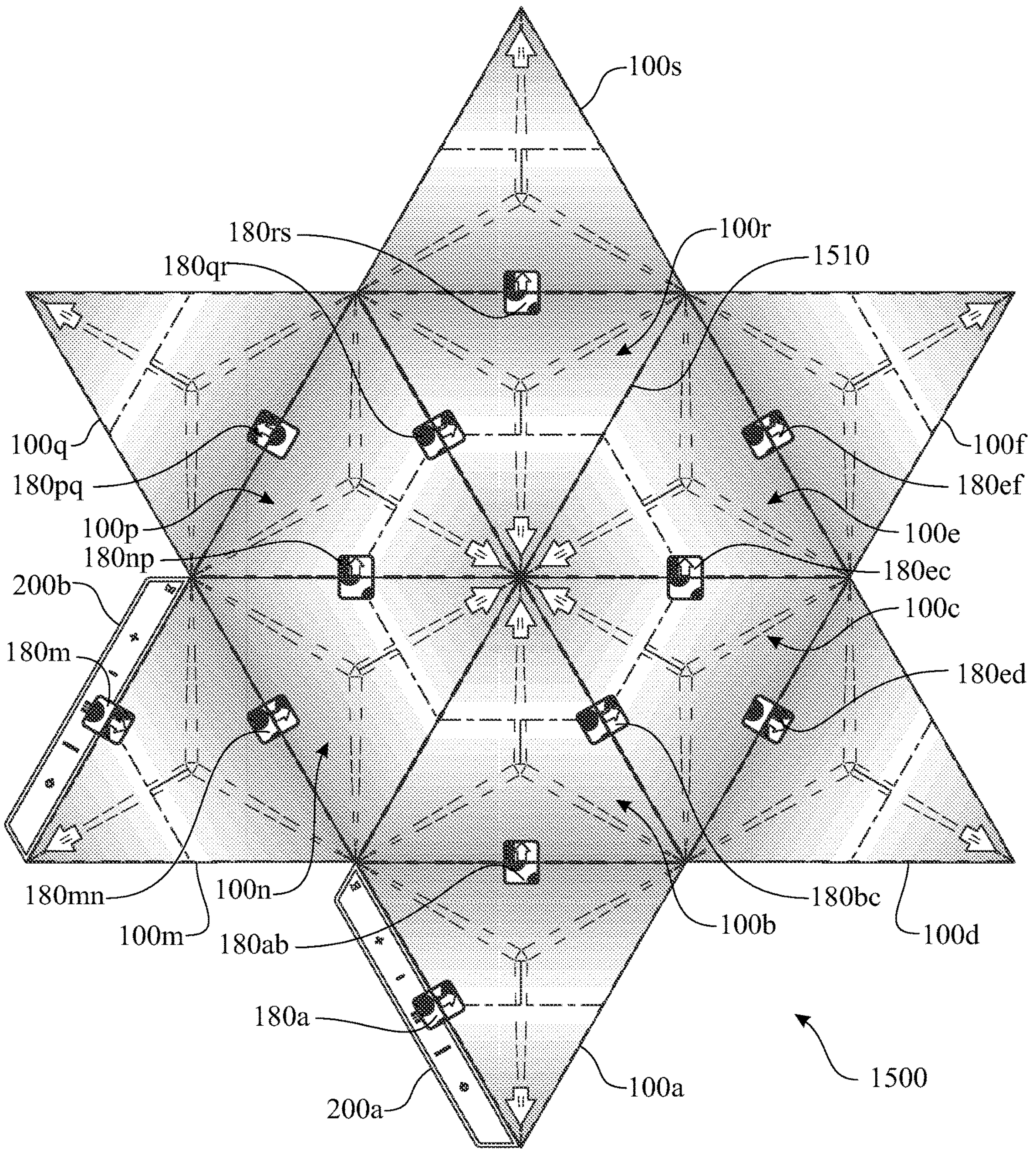
FIG. 33 presents and arrangement of two systems of six geometric panels each forming a six pointed star, two controllers, and their respective interconnections.
Figure 34:
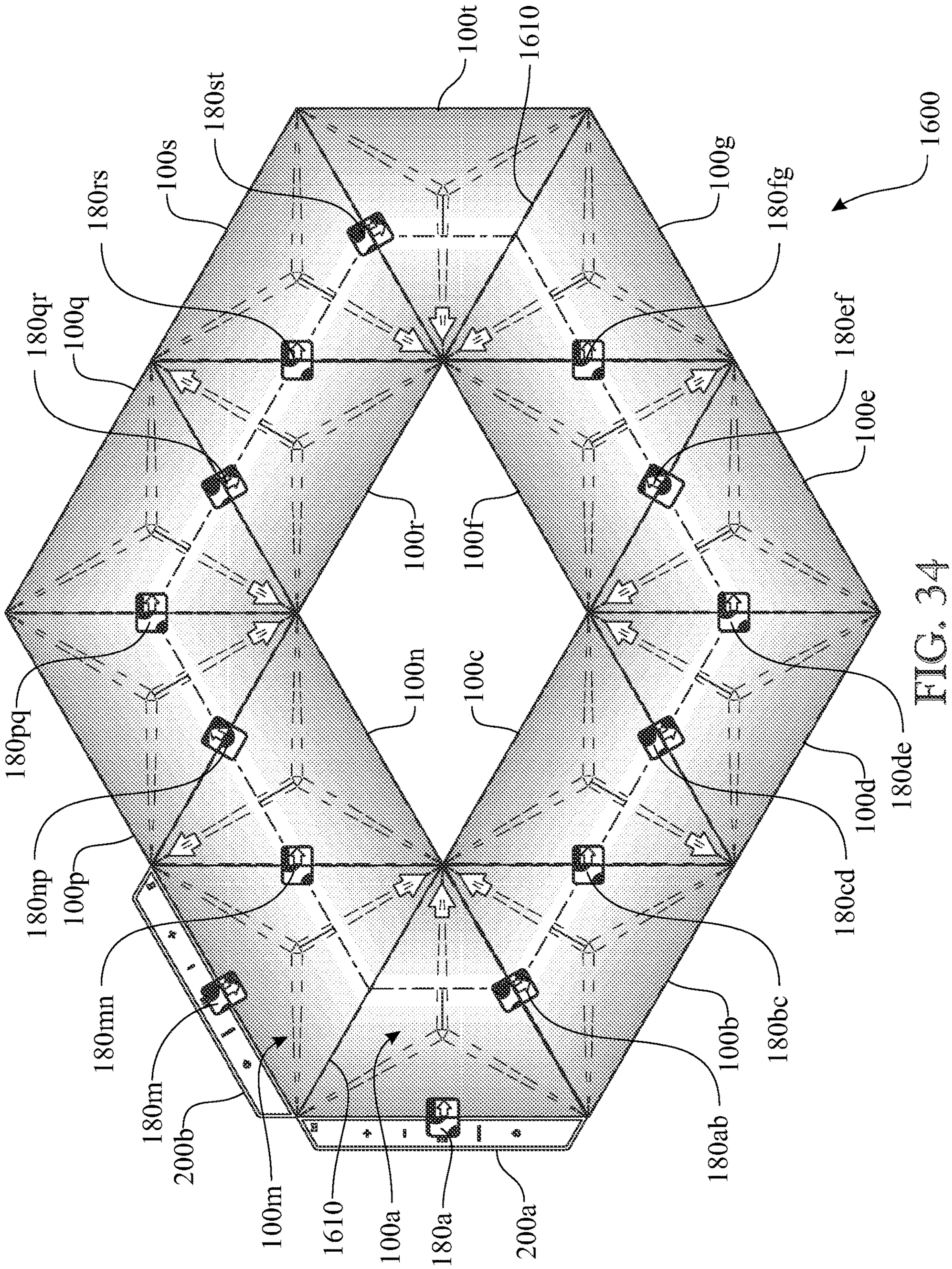
FIG. 34 presents another multi-system configuration of fourteen geometric panels, two controllers and their respective interconnections.
Figure 35:
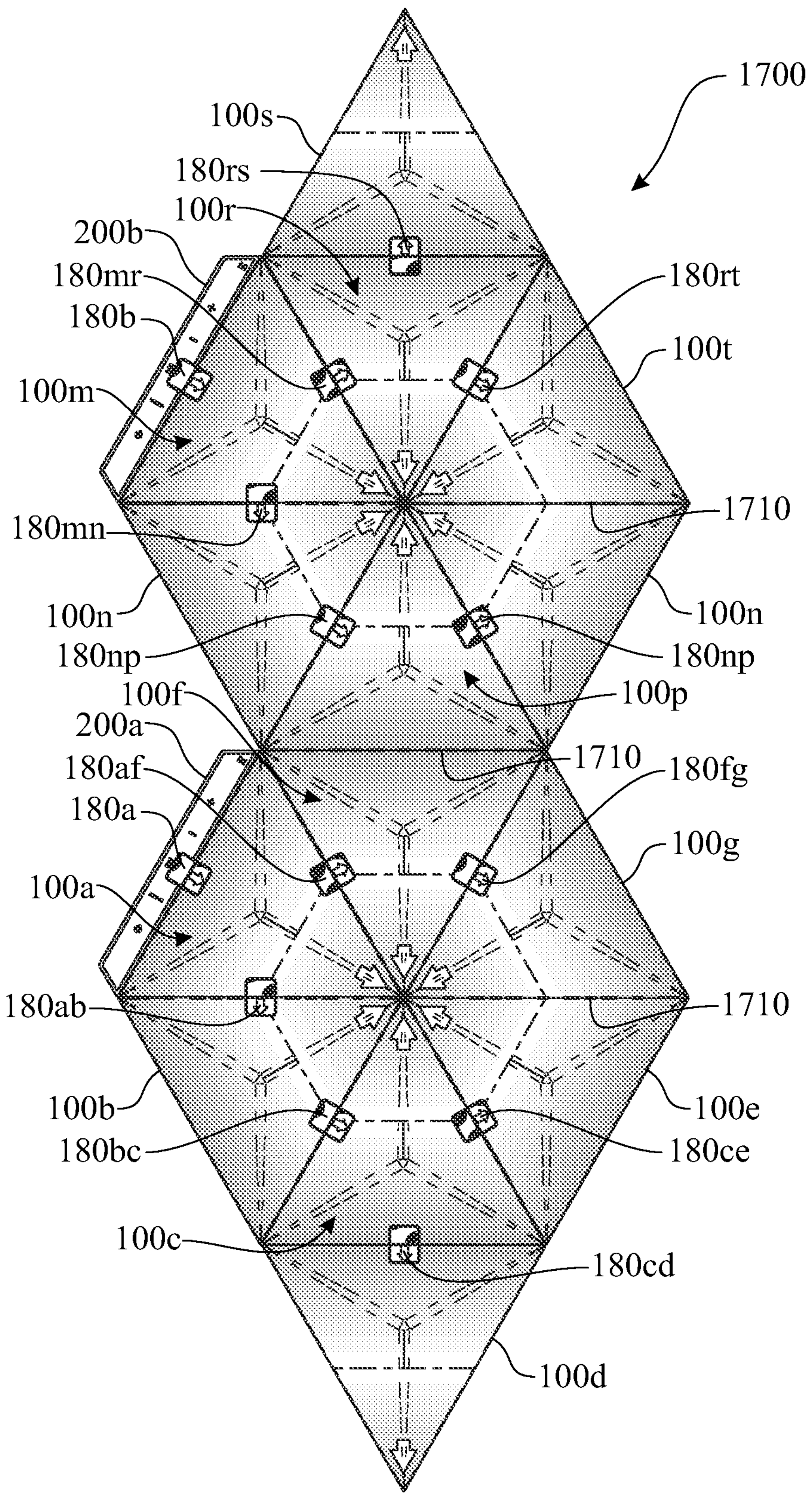
FIG. 35 presents a configuration of two systems and the respective controllers forming a geometric shape and their respective interconnections.

For these larger system configurations such as those illustrated in FIGS. 33-35, wherein the total number of light panel assemblies 100 are greater than the maximum number controllable by a single controller 200*a*, a second controller 200*b* needs to be added. In these FIGS. 33-35 the first controller 200*a* is interconnected with light panel assemblies 100*a*-100*f* (FIG. 33), 100*a*-100*g* (FIG. 34), and 100*a*-100*g* (FIG. 35). The second controller 200*b* is interconnected with light panel assemblies 100*m*-100*s* (FIG. 33), 100*m*-100*t* (FIG. 34), and 100*m*-100*t* (FIG. 35). In these configurations 1500 (FIG. 33), 1600 (FIG. 34), and 1700 (FIG. 35), also include interface areas 1510, 1610, and 1710 respectively, where a light panel assembly 100 controlled by first controller 200*a* is positioned adjacent a light panel assembly 100 controlled by second controller 200*b*. These interface areas designate an interface where the adjacent light panel assemblies are not interconnected with a rigid bridge connector 180. Each controller 200*a*, 200*b* is dedicated to a defined set of light panel assemblies to prevent dual electrical signal being directed to one or more light panel assemblies 100.

The above description is considered that of certain embodiments of the present invention only. Modifications of the invention will occur to those skilled in the art and to those who make or use the invention. Therefore, it is understood that the embodiments described herein are merely for illustrative purposes only and are not intended to limit the scope of the invention hereof.

We claim:

1. A geometric light system comprising:

a plurality of light panel assemblies, each light panel assembly further comprising:

a base having a regular geometric shaped outer periphery, the base defining a connector aperture in a bottom of the base of each side of the geometric shape;

a printed circuit assembly mounted to the base and having a plurality of white light emitting diodes and a plurality of colored light emitting diodes populated thereon and electronic circuitry for selectively illuminating the light emitting diodes;

a plurality of electrical connectors positioned about a periphery of the printed circuit assembly, each electrical connector in registration with one of the connector apertures defined in the base;

a prismatically shaped lens affixed to an upper surface of the base; and a plurality of bridge connectors, each bridge connector having electrical connectors configured to electrically mate with electrical connectors of adjacent ones of a first and a second light panel assemblies.

2. The geometric light system according to claim 1 wherein the regular geometric shape of the base is an equilateral triangle.

3. The geometric light system according to claim 1 wherein the base further includes a visible orientation arrow corresponding to the arrangement orientation of the light emitting diodes on the printed circuit assembly of the light panel assembly to aid in the orientation of one light panel assembly to another like light panel assembly.

4. The geometric light system according to claim 1 wherein the prismatically shaped lens is translucent.

5. The geometric light system according to claim 1 wherein the prismatically shaped lens has a raised center and faceted sides, each faceted side corresponding to a side of the light panel assembly.

6. The geometric light system according to claim 1 further including a controller for controlling the plurality of light panel assemblies and having a plurality of microswitches electrically interconnected therewith for manual control inputs.

7. The geometric light system according to claim 6 wherein the microswitches are covered with a flexible membrane having legends embossed thereon for identification of the function of each microswitch.

8. The geometric light system according to claim 6 wherein the printed circuit assembly of the light panel assembly further includes circuitry and logic to illuminate the light emitting diodes thereon in a plurality of predetermined patterns and light motions.

9. The geometric light system according to claim 8 wherein the light panel assemblies of the system are identically responsive to electrical signals from the controller to display identical light patterns and motions concurrently.

10. The geometric light system according to claim 8 wherein the light panel assemblies of the system are responsive to electrical signals from the controller to display a progressive light pattern and motion across the plurality of the light panel assemblies.

11. The geometric light system according to claim 1 wherein the controller further includes circuitry and logic to be remotely responsive to wireless electronic inputs from a remote electronic device for controlling the plurality of light panel assemblies.

12. The geometric light system according to claim 1 wherein each of the rigid bridge connectors is directionally biased to permit flow of electrical signals in one direction only, each connector bearing a visible legend identifying the directional bias of the connector.

13. The geometric light system according to claim 1 further including a hexagonal mounting bracket, the mounting bracket having a magnet housed therein.

14. The geometric light system according to claim 13 wherein the light assembly base defines a hexagonal aperture in a bottom surface thereof for receiving the hexagonal mounting bracket.

15. The geometric light system according to claim 14 wherein the light assembly base further includes a magnetically sensitive plate mounted over the hexagonal aperture in a manner that the magnetic force of the mounting bracket magnet retains the light panel assembly in a desired location and position, the light panel assembly being readily detachable and repositionable from the hexagonal mounting bracket by overcoming the magnetic force.

16. The geometric light system according to claim 1 wherein the bridge connectors are electrically bidirectional.

17. The geometric light system according to claim 16 wherein the printed circuit assembly of the light panel assembly further includes circuitry and logic to determine which of the connectors at its various sides is functioning as an electrical input and automatically electrically configures the remaining connectors at its remaining sides as an electrical output.

18. A geometric light system comprising:

a plurality of light panel assemblies, each light panel assembly further comprising:

a base having an equilateral triangle shaped outer periphery, the base defining a connector aperture in a bottom of the base at each side of the triangular shape;

a printed circuit assembly mounted to the base and having a plurality of light emitting diodes populated thereon and electronic circuitry for selectively illuminating the light emitting diodes and circuitry and logic to illuminate the light emitting diodes thereon in a plurality of predetermined patterns and light motions;

a plurality of electrical connectors positioned about a periphery of the printed circuit assembly, each electrical connector in registration with one of the connector apertures defined in the base;

a prismatically shaped translucent lens having a raised center and a facet corresponding with each side of the base and affixed to an upper surface of the base; and a plurality of bridge connectors, each bridge connector having electrical connectors configured to electrically mate with electrical connectors of adjacent ones of a first and a second light panel assemblies.

19. The geometric light system according to claim 18 wherein the light assembly base defines a hexagonal aperture in a bottom surface thereof for receiving a hexagonal mounting bracket.

20. The geometric light system according to claim 19 wherein the light assembly base further includes a magnetically sensitive plate mounted over the hexagonal aperture in a manner that the magnetic force of the mounting bracket magnet retains the light panel assembly in a desired location and position, the light panel assembly being readily detachable and repositionable from the hexagonal mounting bracket by overcoming the magnetic force.

* * * * *